United States Patent [19]

Logan

[11] Patent Number: 5,742,297
[45] Date of Patent: Apr. 21, 1998

[54] APPARATUS AND METHOD FOR CONSTRUCTING A MOSAIC OF DATA

[75] Inventor: Mark J. Logan, Langhorne, Pa.

[73] Assignee: Lockheed Martin Corporation, Syracuse, N.Y.

[21] Appl. No.: 334,292

[22] Filed: Nov. 4, 1994

[51] Int. Cl.$^6$ ................................................ G06F 15/00
[52] U.S. Cl. ........................................................ 345/438
[58] Field of Search ............................... 395/133, 136, 395/137, 138; 345/117, 118

[56] References Cited

U.S. PATENT DOCUMENTS

| | | | |
|---|---|---|---|
| 3,569,616 | 3/1971 | Baker | 178/6.8 |
| 3,611,371 | 10/1971 | Morse | 343/5 CD |
| 3,633,173 | 1/1972 | Edge | 340/172.5 |
| 3,671,723 | 6/1972 | Delignieres et al. | 235/150.27 |
| 3,684,915 | 8/1972 | Gangawere | 315/23 |
| 3,723,718 | 3/1973 | Jaffe et al. | 392/185 |
| 3,727,217 | 4/1973 | Nirasawa | 343/5 ST |
| 3,737,120 | 6/1973 | Green | 244/3.17 |
| 3,765,018 | 10/1973 | Heard et al. | 343/55 C |
| 3,774,202 | 11/1973 | Nolette | 343/5 CM |
| 3,797,014 | 3/1974 | Tompkins et al. | 343/5 DP |
| 3,798,425 | 3/1974 | Heard et al. | 235/150.27 |
| 3,810,174 | 5/1974 | Heard et al. | 343/5 DP |
| 3,836,961 | 9/1974 | Ennis et al. | 343/6 TV |
| 3,838,420 | 9/1974 | Heard et al. | 343/5 SC |
| 3,904,817 | 9/1975 | Hoffman et al. | 178/6.8 |
| 4,002,827 | 1/1977 | Nevin et al. | 358/140 |
| 4,010,466 | 3/1977 | Hofstein | 343/5 |
| 4,065,770 | 12/1977 | Berry | 343/5 |
| 4,099,179 | 7/1978 | Hofstein | 343/5 |
| 4,106,021 | 8/1978 | Katagi | 343/5 |
| 4,128,838 | 12/1978 | Brands et al. | 343/55 C |
| 4,220,969 | 9/1980 | Nitadori | 358/140 |
| 4,275,415 | 6/1981 | Engle | 358/140 |
| 4,310,853 | 1/1982 | Madson | 358/140 |
| 4,347,618 | 8/1982 | Kavouras et al. | 375/37 |
| 4,364,048 | 12/1982 | Waters et al. | 343/5 |

(List continued on next page.)

FOREIGN PATENT DOCUMENTS

| | | |
|---|---|---|
| 1103345 | 6/1981 | Canada . |
| 1103346 | 6/1981 | Canada . |
| 0299666 | 1/1989 | European Pat. Off. . |
| 0351654 | 1/1990 | European Pat. Off. . |
| 0383282 | 9/1990 | European Pat. Off. . |
| 88/08988 | 11/1988 | WIPO . |
| WO91/20047 | 12/1991 | WIPO . |

OTHER PUBLICATIONS

Q. Zheng et al. "A Computational Vision Approach to Image Registration" in *IEEE Transactions on Image Processing*, vol. 2, No. 3, pp. 311–326 (Jul. 1993).

N. Lannelongue et al. "Realisation of a mosaic radar" in *Bulletin Societe Francaise de Photogrammetrie et de Teledetection* No. 79–80, pp. 41–48 (1980).

J.C. Curlander et al. "Making Mosaics of SAR Imagery" in *NTIS Tech Notes* p. 669 (Aug. 1, 1990).

*Primary Examiner*—Phu K. Nguyen
*Attorney, Agent, or Firm*—Stephen A. Young; Paul Checkovich

[57] ABSTRACT

Apparatus and method combine, in real time, weather radar data in digital format from multiple radar sites into a mosaic covering a regional or national area (e.g., the continental United States). Such apparatus and method are implementable as computer software that can be run on a general purpose computer such as a personal computer. Preferably, a database of "lookup tables" are used to project individual radar data bins directly to a grid of the desired coordinate system for that mosaic. Using these lookup tables, each of a plurality of radar data bins is converted to a corresponding grid location or box in a mosaic image. While each radar data bin is mapped to a grid box for the mosaic, not every such grid box within the coverage area of the radar may receive such a data bin. Any resulting holes in the produced mosaic are then identified using yet another grid whose locations correspond to those of the mosaic but which instead provide information regarding the data then appearing in corresponding locations in that mosaic. Each such hole is then filed with data from the locationally closest data bin.

38 Claims, 17 Drawing Sheets

U.S. PATENT DOCUMENTS

| | | | |
|---|---|---|---|
| 4,369,441 | 1/1983 | Wohlmuth | 340/733 |
| 4,383,258 | 5/1983 | Morin | 343/55 C |
| 4,412,220 | 10/1983 | Aanstoot et al. | 343/55 C |
| 4,434,422 | 2/1984 | Kenol et al. | 358/160 |
| 4,434,437 | 2/1984 | Strolle et al. | 358/140 |
| 4,485,402 | 11/1984 | Searby | 358/140 |
| 4,521,857 | 6/1985 | Reynolds, III | 364/439 |
| 4,547,803 | 10/1985 | Richards | 343/55 C |
| 4,568,941 | 2/1986 | Thomas et al. | 340/703 |
| 4,601,001 | 7/1986 | Guiglini | 364/518 |
| 4,612,544 | 9/1986 | Da Silva et al. | 343/5 DP |
| 4,673,929 | 6/1987 | Nelson et al. | 342/456 |
| 4,688,046 | 8/1987 | Schwab | 340/747 |
| 4,697,185 | 9/1987 | Thomas et al. | 342/185 |
| 4,700,181 | 10/1987 | Maine et al. | 358/183 |
| 4,729,029 | 3/1988 | Henri et al. | 358/140 |
| 4,745,475 | 5/1988 | Bicknell | 358/140 |
| 4,754,279 | 6/1988 | Cribbs | 342/185 |
| 4,774,516 | 9/1988 | Henri et al. | 342/185 |
| 4,774,678 | 9/1988 | David et al. | 395/136 |
| 4,827,432 | 5/1989 | Kasano | 364/518 |
| 4,829,455 | 5/1989 | Long et al. | 364/521 |
| 4,833,475 | 5/1989 | Pease et al. | 342/185 |
| 4,845,501 | 7/1989 | Pease et al. | 342/185 |
| 4,857,899 | 8/1989 | Ishii | 340/701 |
| 4,862,154 | 8/1989 | Gonzalez-Lopez | 340/747 |
| 4,873,515 | 10/1989 | Dickson et al. | 340/728 |
| 4,876,651 | 10/1989 | Dawson et al. | 364/449 |
| 4,931,801 | 6/1990 | Hancock | 342/185 |
| 4,953,227 | 8/1990 | Katsuma et al. | 382/18 |
| 4,954,819 | 9/1990 | Watkins | 340/721 |
| 4,970,636 | 11/1990 | Snodgrass et al. | 364/518 |
| 4,970,682 | 11/1990 | Beckwith, Jr. et al. | 364/900 |
| 5,027,112 | 6/1991 | Ross et al. | 340/792 |
| 5,036,326 | 7/1991 | Andrieu et al. | 342/176 |
| 5,093,798 | 3/1992 | Kita | 364/518 |
| 5,097,268 | 3/1992 | Bauer, Jr. et al. | 342/160 |
| 5,150,295 | 9/1992 | Mattingly | 342/185 |
| 5,227,895 | 7/1993 | Carlebach | 358/456 |
| 5,255,190 | 10/1993 | Sznaider | 364/420 |
| 5,307,493 | 4/1994 | Gusenius | 395/700 |
| 5,313,611 | 5/1994 | Franklin et al. | 395/425 |
| 5,315,305 | 5/1994 | Noll | 342/185 |
| 5,337,057 | 8/1994 | Michie | 342/176 |
| 5,357,258 | 10/1994 | May | 342/185 |
| 5,390,305 | 2/1995 | Takahashi et al. | 395/375 |
| 5,418,896 | 5/1995 | Kumamoto et al. | 395/133 |
| 5,519,401 | 5/1996 | Farmer et al. | 342/185 |

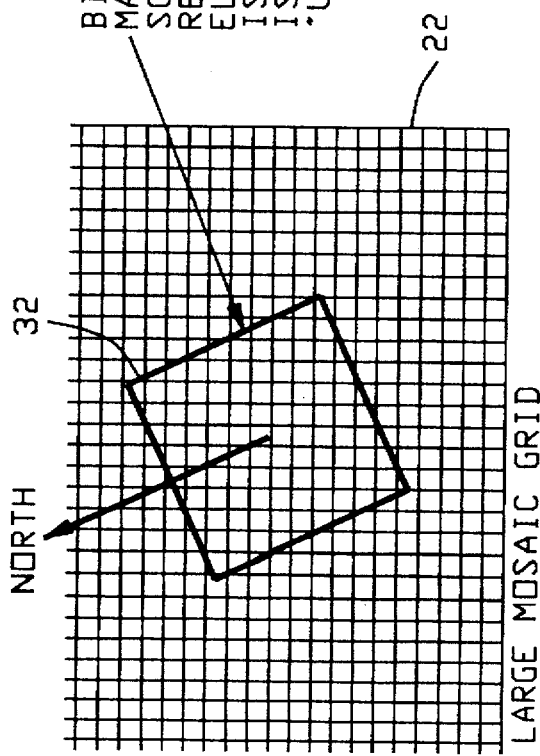

BINS OF WEATHER RADAR DATA ARE MAPPED TO THE LARGE GRID IN THIS SQUARE EACH TIME A GRID ELEMENT RECEIVES A BIN THEN A CORRESPONDING ELEMENT IN THE TEMPORARY ARRAY IS "SET". THE TEMPORARY ARRAY IS THEN CHECKED FOR ANY "UNSET" ELEMENTS.

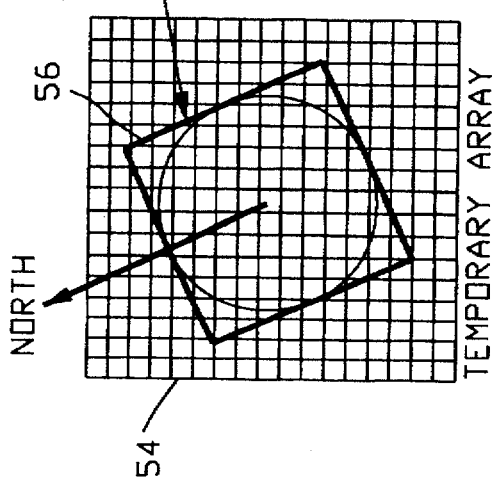

THIS CIRCLE REPRESENTS THE RANGE OF WEATHER DATA IN THE WEATHER RADAR PRODUCT. ALL ARRAY ELEMENTS WITHIN THE CIRCLE ARE TO RECEIVE A DATA BIN. IF AN ARRAY ELEMENT IS FOUND WITHOUT A BIN, THEN A "BACK CALCULATION" IS PERFORMED TO FIND THE CLOSEST DATA BIN. THAT DATA BIN X,Y AND CORRESPONDING GRID X,Y ARE ADDED TO THE LOOK UP TABLE TO FILL THE HOLE IN THE MOSAIC GRID.

FIG. 7

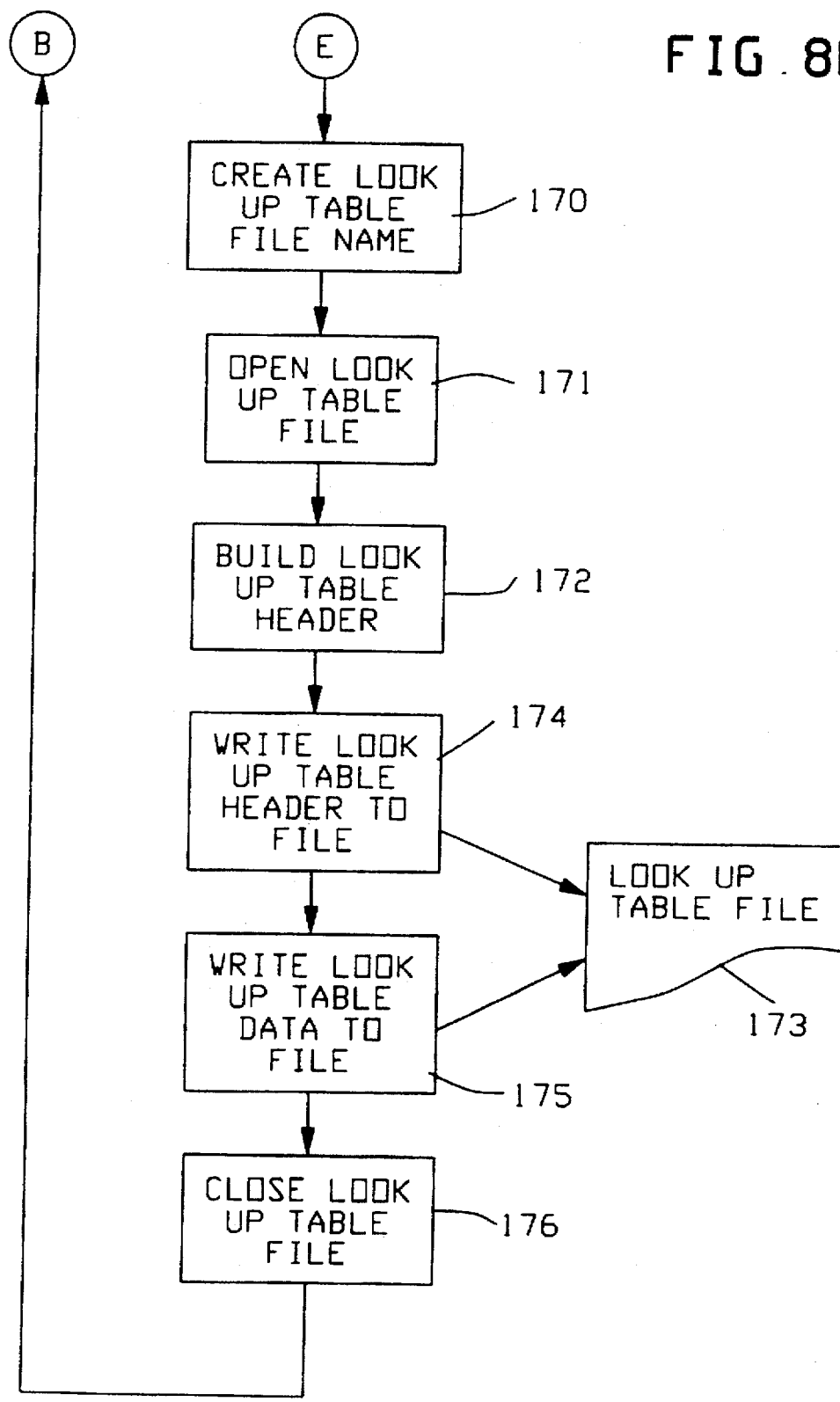

APPARATUS AND METHOD FOR CONSTRUCTING A MOSAIC OF DATA

A portion of the disclosure of this patent document contains material which is subject to copyright protection. The copyright owner has no objection to the facsimile reproduction by anyone of the patent document or the patent disclosure, as it appears in the U.S. Patent & Trademark Office patent files or records, but otherwise reserves all copyright rights whatsoever.

FIELD OF THE INVENTION

The present invention relates to display of radar images, and more particularly to producing such a display by combining a plurality of radar images into a mosaic of those images. The present invention also relates to electrical computers and data processing systems, and more particularly to applications of same to earth science such as weather. The present invention further relates to information processing system organization, and more particularly to applications using artificial intelligence with details of the artificial intelligence system such as for earth sciences such as weather. The present invention still further relates to communications, directive radio wave systems and devices (e.g. radar or radio navigation), and more particularly to weather radar, plural radar, display circuits for image production or scan conversion for same, and directive radio wave systems and devices for position indicating (e.g. triangulation) for storm location.

BACKGROUND OF THE INVENTION

There exist applications in which there is a need to combine several radar images into a single mosaic image covering a geographical area. The present invention fulfills that need.

There is a large number of weather radar sites distributed across the U.S.A. There is a national weather radar network consisting of the new NEXRAD WSR-88D weather surveillance Doppler radars and the preexisting WSR-57 and WSR-74 non-Doppler weather radars. Each such site can essentially operate independently, but the ranges of these sites can overlap. It is necessary to assemble the data from these sites into a single mosaic showing weather conditions in a particular region or across the country. The present invention fulfills this need.

A mosaic of radar data can provide location and intensity of precipitation and severe weather throughout a large geographic area and is, therefore, useful to meteorologists and other persons responsible for monitoring and forecasting weather conditions. Creation of a mosaic of radar data usually requires conversion of data points from a local geographic coordinate system (wherein the positions there are defined relative to an individual radar site) to the geographic coordinate system of the mosaic. Conversion of data points from one coordinate system to another coordinate system (reprojection) is a computationally intensive task, but is necessary to ensure accuracy. Radar data from even one site, however, can consist of over 100,000 individual data values, each of which must be reprojected. A mosaic could be made up of data from dozens of such radar sites. There is therefore a need to accurately combine all of that data from all desired sites fast enough to provide a current depiction of the weather. The present invention fulfills this need.

SUMMARY OF THE INVENTION

Accordingly, an object of the present invention is to provide apparatus and method for combining data from a plurality of sites into a single image covering a desired geographical area.

Another object of the present invention is to provide apparatus and method capable of combining, in real time, radar data (such as weather radar data) in digital format from multiple radar sites into a mosaic covering a geographical area.

A further object of the present invention is to provide apparatus and method for combining data from a plurality of sources into a single image that can be run on a general purpose computer such as a personal computer.

Still another object of the present invention is to provide apparatus and method capable of producing a mosaic of radar data that can provide location and intensity of precipitation and other meteorological phenomena throughout a large geographic area.

A still further object of the present invention is to provide apparatus and method capable of accurately combining a substantial amount of data from a plurality of desired sites fast enough to provide a current depiction of the weather or other phenomena.

Yet another object of the present invention is to provide apparatus and method capable of accurately yet efficiently building mosaics of radar data.

Briefly, these and other objects of the present invention are accomplished by apparatus and method for converting each of a plurality of radar data bins to a corresponding grid location or box in a mosaic image. However, while each radar data bin is mapped to a grid box for the mosaic, not every such grid box within the coverage area of the radar may receive a bin. This may occur because there may be more grid boxes available than there are radar bins, or because the radar data bins do not overlap perfectly. After the mapping from bins to boxes is completed, the inventive apparatus and method then goes back and fills those holes in the following manner. Bins of radar data are mapped to a predetermined grid for a portion of the resulting display. Each time that a grid element of that grid receives a bin, then a corresponding element in the temporary array is "set". The temporary array is then checked for any "unset" or blank elements. If an array element is found without a bin, then the locationally closest data bin is found. That closest data bin and its corresponding grid location are used to fill the hole in the mosaic grid.

Other objects, advantages and novel features of the invention will become apparent from the following detailed description of the invention when considered in conjunction with the accompanying drawings.

BRIEF DESCRIPTION OF THE DRAWINGS

In the drawings,

FIG. 7 provides a diagrammatic representation of one embodiment of a method of filling any one of the holes of FIG. 6 according to the present invention;

FIGS. 8A, 8B, 8C, 8D and 8E together show a flowchart for one method of building the lookup table of FIGS. 4 and 5.

DETAILED DESCRIPTION

Figure 1:
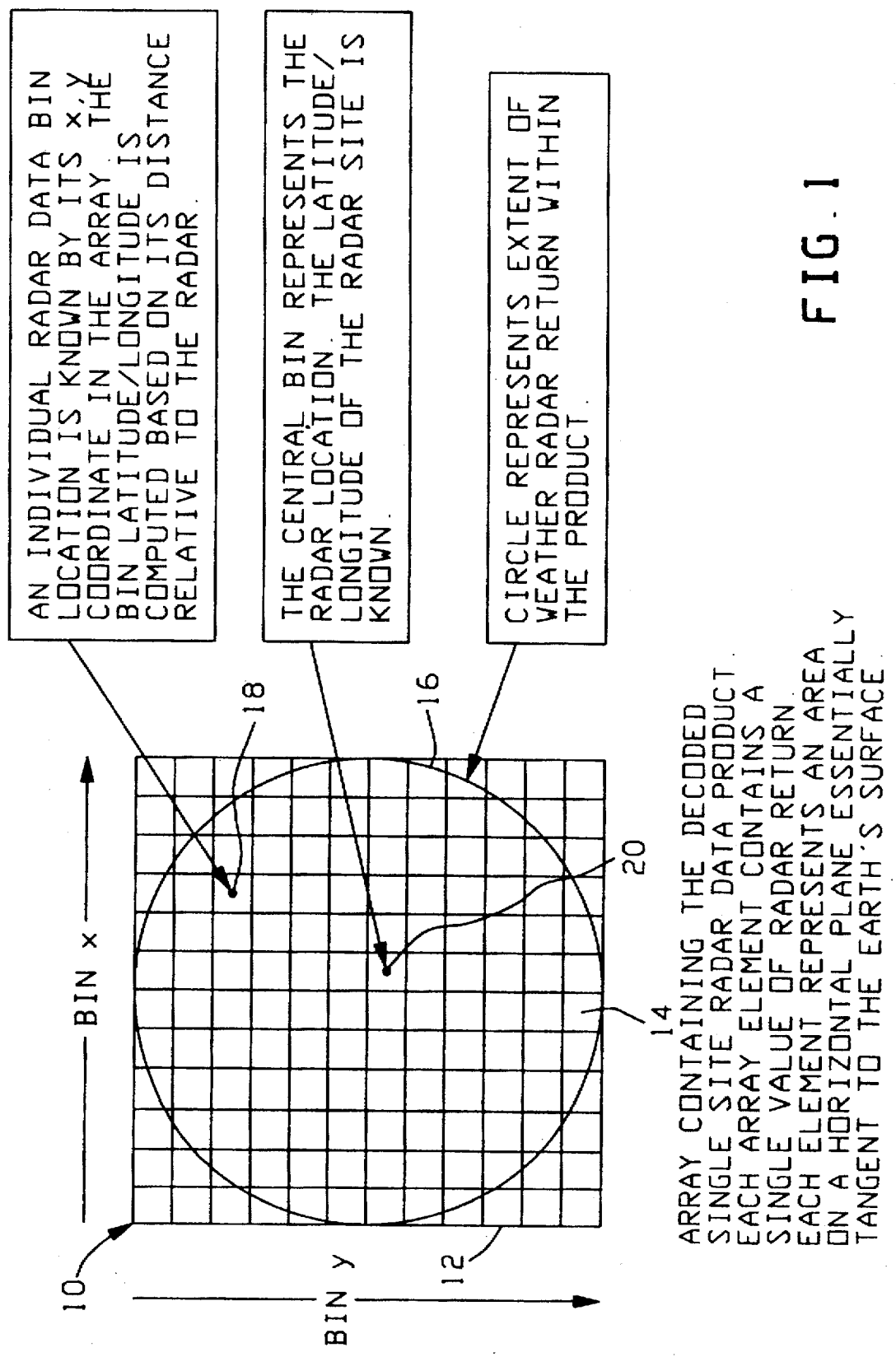
FIG. 1 is a diagrammatic representation of a two dimensional array for the display of a single site radar product.

Referring now to the drawings, wherein like reference characters designate like or corresponding parts throughout the several views, there is shown in FIG. 1 an array 10 made up of a plurality of elements or pixels, of which one is identified by reference numeral 12. Each array element (such as element 12) contains a single value of radar return. Each such element represents a finite area on a horizontal plane essentially tangent to the earth's surface. Array 10 contains one example of a decoded single site radar data product 14. In array 10, product representation 14 is bounded by circle 16 representing the extent of weather radar data return within the product. Within product 14, an individual radar data bin location (such as location 18) is identified by its x, y coordinates in the array, with the bin latitude and longitude being computed based on its distance relative to the radar site. Central bin 20 represents the radar site location. For a fixed radar site, the latitude and longitude of the radar site is known, so that referencing an individual bin with respect to location of the central bin will provide precise position information for that individual bin also. The single site radar data is received in digital format which allows the data values to be assigned to a computer program's memory in a two-dimensional array 10. Each array element (such as element 12) is a data "bin" which represents an atmospheric parameter (e. g. precipitation intensity) within a relatively small finite area such as 1 kilometer by 1 kilometer. Thus, the coordinates of any one bin (such as bin 18) can provide the geographic x,y distance of that bin from the radar site.

Figure 2:
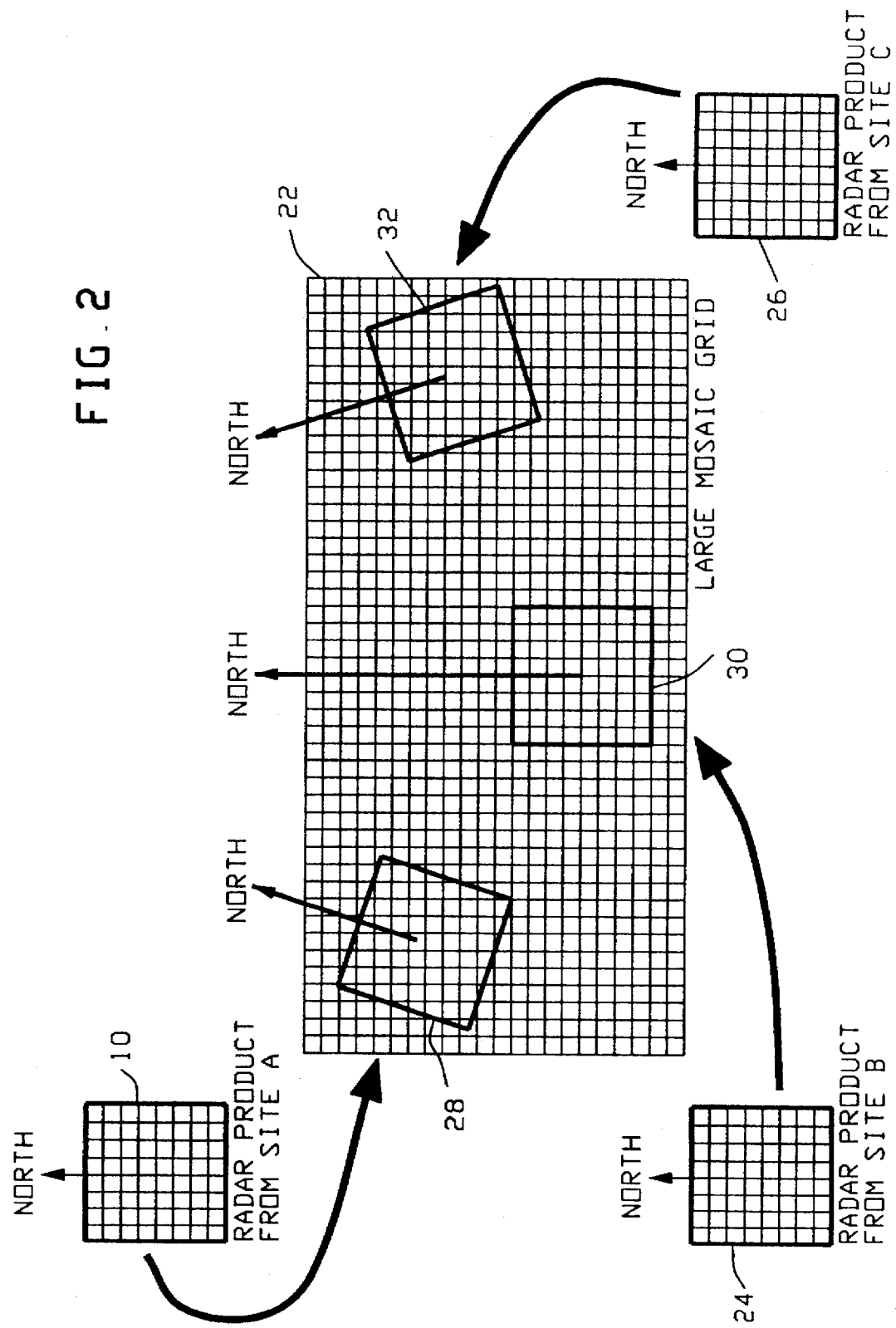
FIG. 2 is a diagrammatic representation of one example of mapping of individual weather radar product data into a larger mosaic grid.

However, often more than one radar product must be used in a single grid array or visual representation of weather conditions in a region. This may be because the range for two radar sites may overlap, or because it is desired to show, in one display, radar data for a geographic area that is sufficiently large to include a plurality of radar sites. In such situations, a mosaic is built by taking the individual data bins from the radar data for a single site and assigning the values for those bins to the corresponding locations in a large scale (e.g. regional or national) grid which preferably also resides in a computer memory as a two-dimensional array 22. A simple example of formation of such a mosaic is shown in FIG. 2. FIG. 2 shows one example of mapping of individual weather radar product data from arrays 10, 24 and 26, such as from different radar sites, into a larger scale mosaic grid 22. Each array 10, 24 and 26 here represents radar product from a single site A, B, or C respectively. Each such array 10, 24 and 26 is similar to array 10 of FIG. 1. As shown in FIG. 2, the data from array 10 is combined with data from other such arrays 24 and 26 to construct a mosaic grid 22 which covers the geographic area that includes all three such radar sites. Thus, in the example of FIG. 2, array 10 is mapped onto portion or subarray 28 of grid 22; array 24 is mapped onto portion or subarray 30 of grid 22; and array 26 is mapped onto portion or subarray 32 of grid 22. In the example of FIG. 2, the coordinate system of the radar data from a single radar site does not necessarily match the coordinate system of the mosaic grid 22. That is, the bins of arrays 10, 24 and 26 and the grid boxes of grid 22 are not necessarily the same size, and the respective coordinate systems are not necessarily oriented the same way. For this reason, the coordinates of each bin from an array 10, 24 or 26 must be converted (i.e. reprojected) to the coordinates of grid 22.

Figure 3:
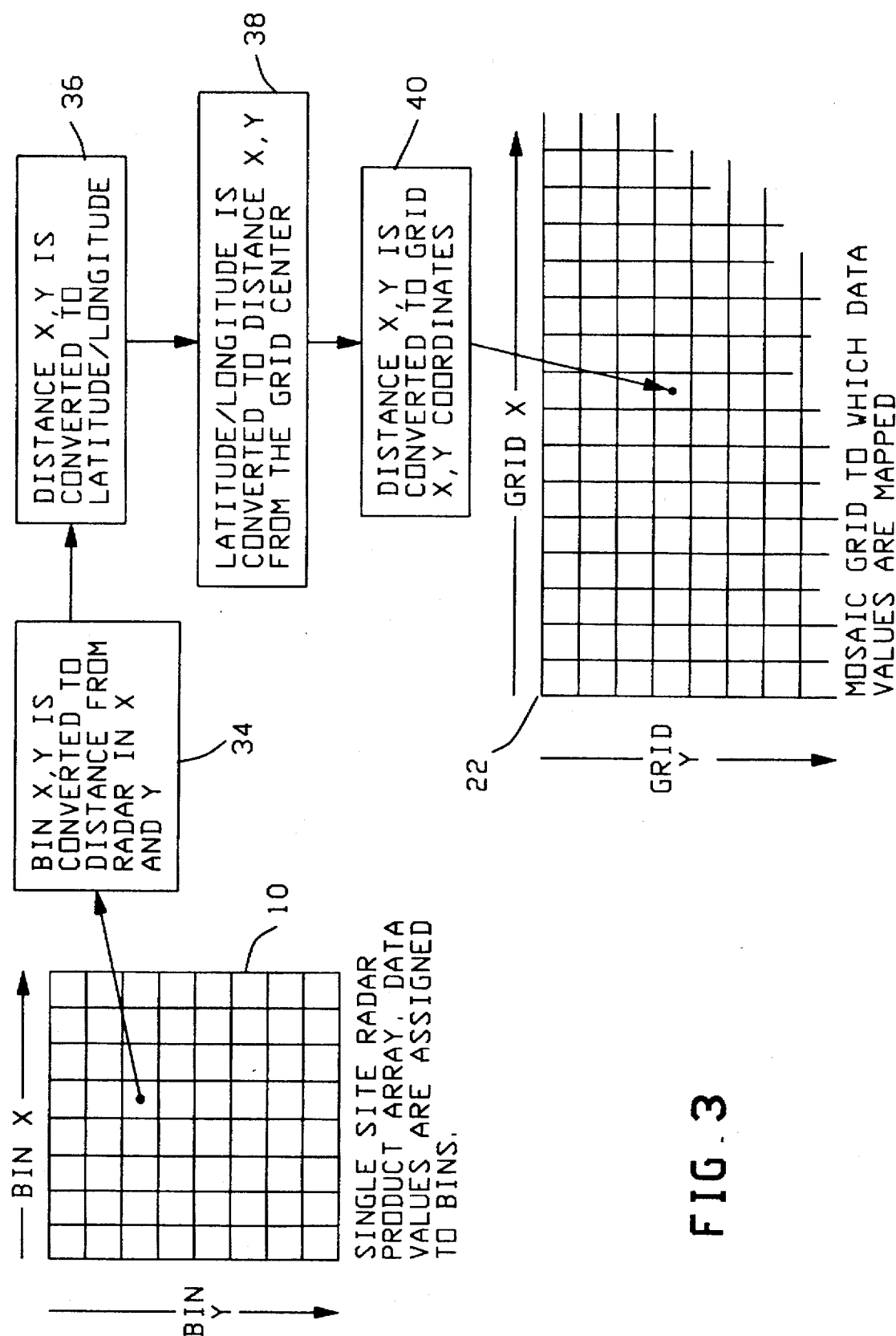
FIG. 3 is a diagrammatic representation of an overview of a process according to the present invention to indirectly map individual radar data values to a mosaic grid according to the present invention.

One method of reprojecting the coordinates of an individual data point such as for transfer from array 10 to grid 22 according to the present invention is shown in FIG. 3. FIG. 3 shows an overview of a process according to the present invention to indirectly map individual radar data values such as from array 10 to a mosaic grid such as grid 22. In single site radar product array 10, data values are assigned to bins. In the method of FIG. 3, each bin is converted to latitude and longitude and then that latitude and longitude is converted to the corresponding grid location. At step 34, each set of bin coordinates x,y is converted to distance from radar site 20 on the x and y axes. At step 36, this distance in the form of x and y values is then converted to geographic latitude and longitude. At step 38, these values of latitude and longitude are then converted to x, y distance from the grid 22 center, now using the x and y axes of grid 22. At step 40, this x, y distance is converted to the corresponding x and y coordinate values for grid 22. In this manner, data values from an array 10 are mapped to mosaic grid 22. A similar procedure can be utilized for mapping from other arrays 24, 26 to grid 22. Although this approach is accurate, it is not preferred because it is computationally intensive (see steps 34, 36, 38 and 40) and therefore would not be desirable for real-time operation on a general purpose computer such as a personal computer.

Figure 4:
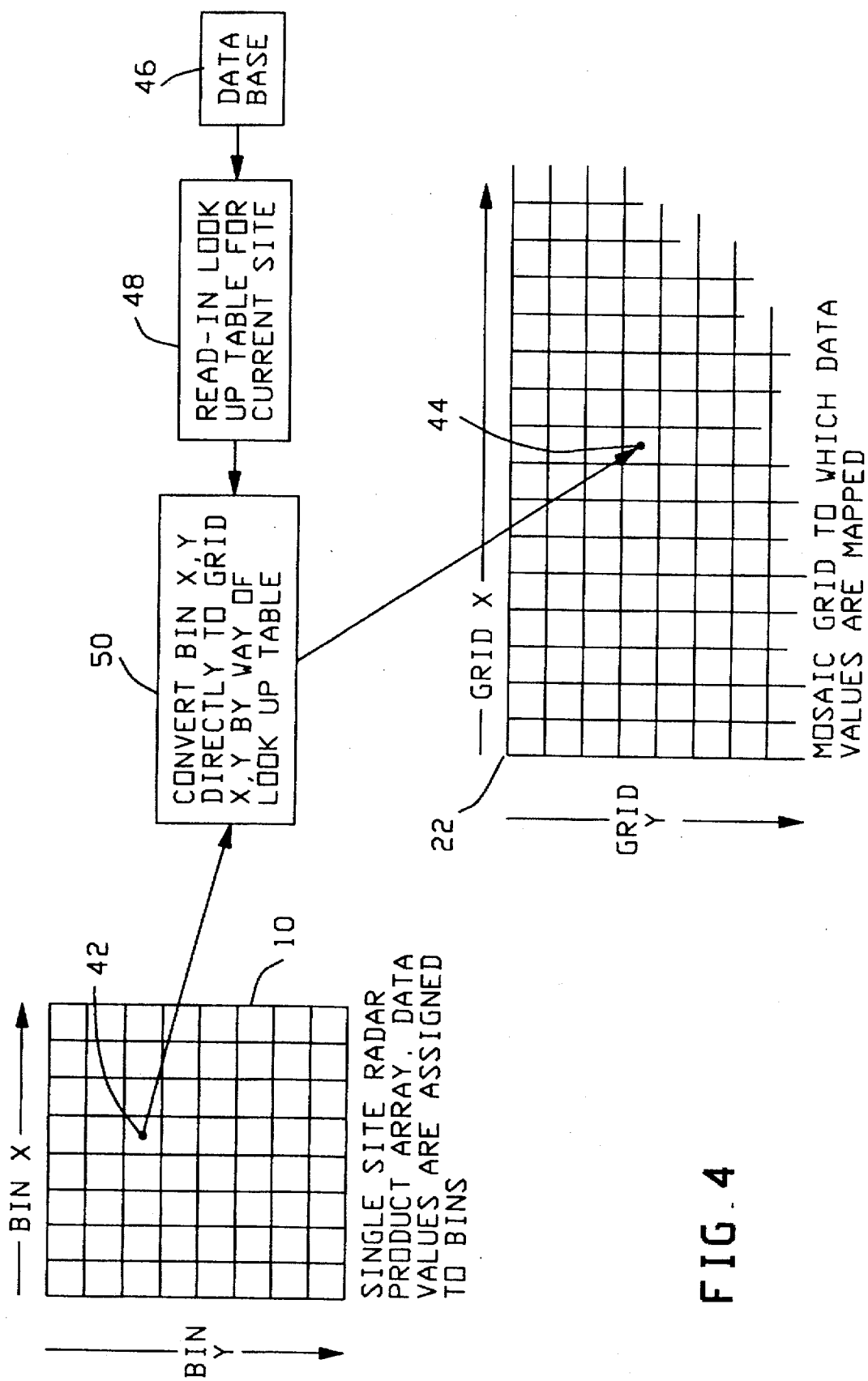
FIG. 4 is a diagrammatic representation of an overview of a process to directly map individual radar data values to a mosaic grid according to a preferred embodiment of the present invention.
Figure 5:
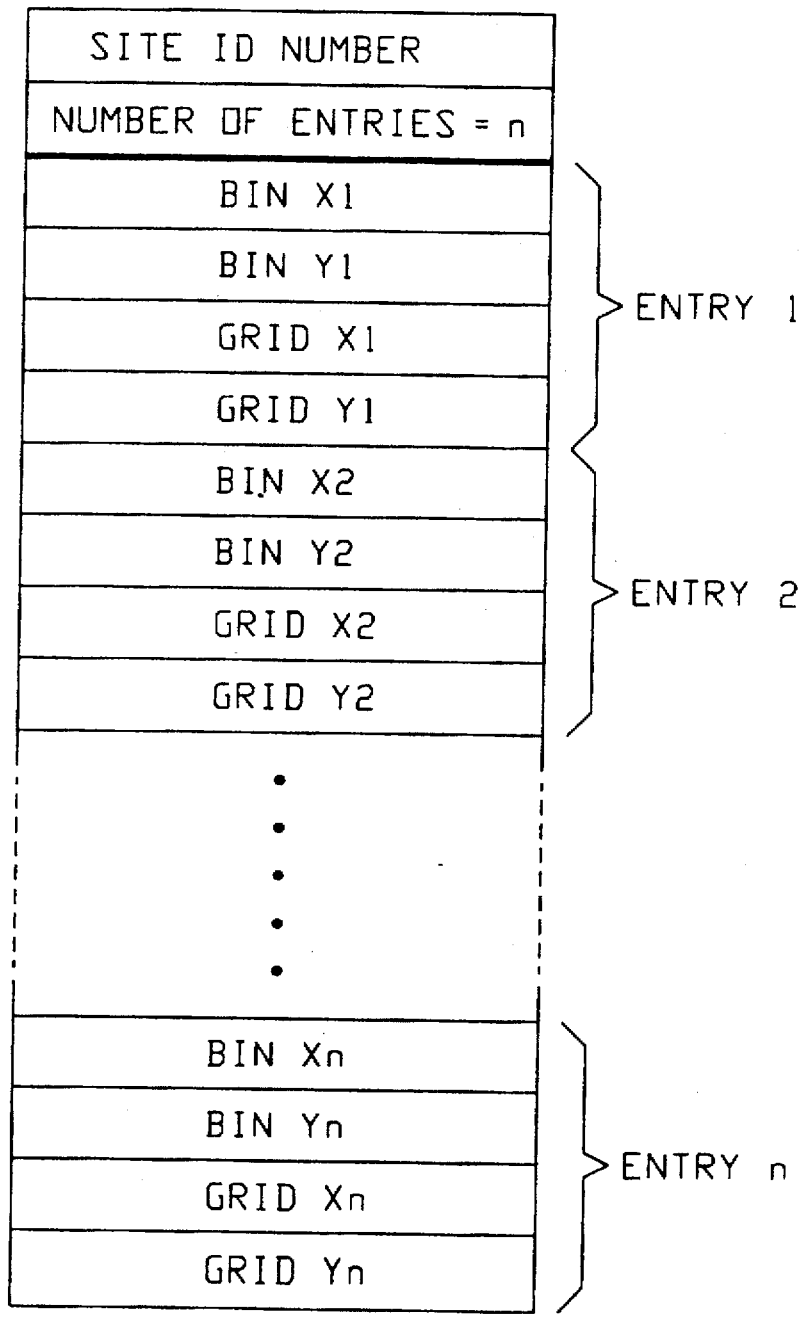
FIG. 5 illustrates the format of a lookup table that can be utilized in the method of FIG. 4.

An alternative, more preferred method for mapping from a single site grid or product array 10 to a mosaic grid 22 is illustrated in FIG. 4. The method of FIG. 4 is more efficient in real time than that of FIG. 3 because the method of FIG. 4 maps the radar data bins directly to the grid 22 using prebuilt look-up tables. These look-up tables are built using computationally intensive algorithms, illustrated in FIG. 8 and shown in the corresponding code for that figure, to compute latitude and longitude of each radar data bin and to convert those latitude and longitude values to box locations of grid 22. Weather data radar sites usually have fixed locations, so that the location and orientation of the product array 10, 24, or 26 for each such site with respect to that of grid 22 is known. These look-up tables are preferably built offline and are preferably stored as files in a computer database 46. The program of FIG. 9 which builds mosaics then reads in the appropriate look-up table file as it processes data from each site. Each look-up table contains a list of bin x,y values and the corresponding grid x,y values preceded by the number of entries in that table. A preferred format for such a look-up table is shown in FIG. 5. Each entry in the look-up table is then processed by assigning the radar data value from bin x,y to the corresponding grid x,y location.

FIG. 4 shows an overview of a preferred process to directly map individual radar data values to a mosaic grid using a prebuilt look-up table. In FIG. 4, in single site radar product array 10, data values are assigned to bins in that array. In the method of FIG. 4, a direct mapping of, for example, bin 42 to box 44 is accomplished in the following manner. A look-up table for each site is stored in database 46. When a mapping of, say, array 10 to grid 22 is to take place, then the look-up table for the site for array 10 is read in from database 46 at step 48. Then, each bin (e.g. bin 42) of array 10 is mapped to a box (e.g. box 44) of grid 22 by converting that bin's x and y coordinate values directly to x, y coordinate values for grid 22 by finding the former in the look-up table and reading out the corresponding grid box location from that table, at step 50. Grid 22 is the mosaic grid to which data values such as from array 10 are mapped. In effect, with the method of FIG. 4, steps 34, 36, 38 and 40 of FIG. 3 are performed in advance offline to reduce the amount of processing required during real-time operation.

FIG. 5 shows one example of a file format for a lookup table of FIG. 4. In FIG. 5, all entry values are integers. Each file is site specific. Also, each file is specific to the coordinate system and spatial resolution of the individual product (e.g. product 14) and of the mosaic grid (e.g. grid 22). A given bin x, y coordinate can be paired with more than one grid x, y coordinate. Likewise, a given grid x, y coordinate can be paired with more than one bin x, y coordinate. However, there is at least one table entry for each bin x, y coordinate, and there is at least one entry for each grid x, y coordinate. However, the total number of entries likely would not exceed the larger of the number of bins or the number of boxes to be mapped.

Figure 6:
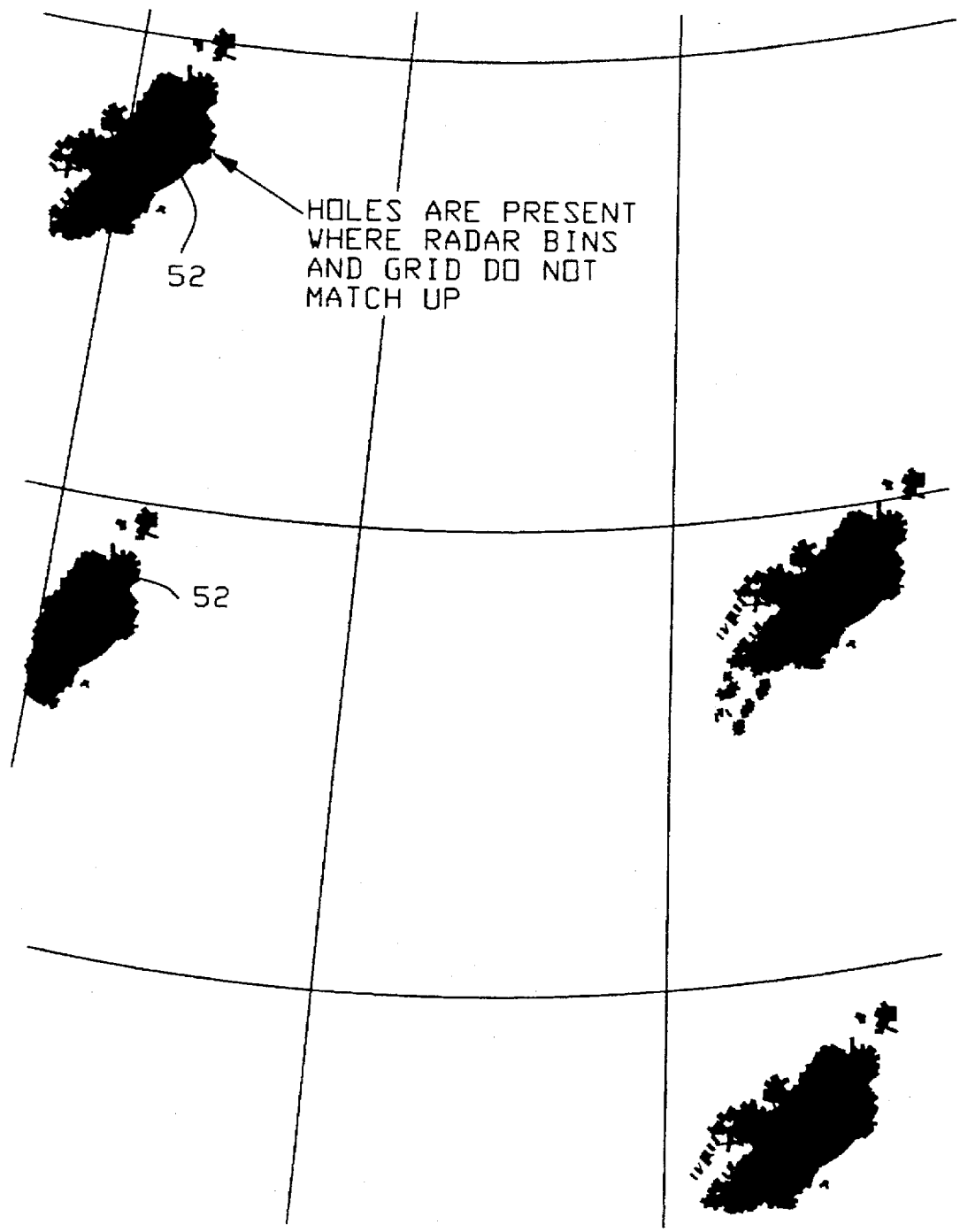
FIG. 6 shows one illustrative example of a display resulting from radar data mapping that has holes present where the source data grids and the destination data grid do not match up.

As discussed above, the array of product data bins (e.g. array 10, 24 or 26) will not necessarily be perfectly aligned with mosaic grid 22. As a result, some grid boxes will receive more than one bin. For similar reasons, some grid boxes, within the radar data range, will not receive any bins. In the latter case, "holes" would remain in the completed mosaic, such as can be seen in FIG. 6. FIG. 6 shows one example of radar data mapping having one or more holes 52 where the source and destination grids, i.e. the radar bins and mosaic grid, do not match up. The following additional processing is utilized in the present invention to fill such holes 52 in grid 22. This process is accomplished in the following manner. In the process to build look-up tables as shown in FIG. 8, the location of each such "hole" in the grid is identified and the closest bin is assigned to the grid box having that hole. This is done by using the temporary array of FIG. 7 to find unfilled grid boxes within the radar coverage area. Each time a bin x, y coordinate is paired with a grid x, y position, an element in temporary array 54 is set. Then, when processing of all bin x, y locations for a site is complete, a "backward calculation" is performed for all unset or unfilled grid boxes in temporary array 54 within the range of the radar for which a look-up table is then being constructed. In such a backward calculation, the grid box x, y location is converted to latitude and longitude, and then that latitude and longitude is converted to the corresponding bin x, y coordinate to find the bin closest in location to that bin x, y coordinate for the hole. Each so "back calculated" bin x, y and grid x, y pair is added as an entry to the look-up table for that radar site. This process ensures that every data bin is assigned to the mosaic grid and that every grid box within the range of the radar then being considered is assigned a data value.

FIG. 7 shows use of a temporary array 54 to fill a hole in grid 22. Each element of temporary array 54 can contain any one of three values: a first, initial "blank" value (such as −1); a second "unset" value (such as 0) for each corresponding grid element or box falling within the range of a radar; and a third "set" value (such as +1) indicating that a radar bin has been mapped to the corresponding grid element. In a subarray (such as subarray 32) of grid 22, bins of weather radar data from the corresponding product array (e.g. array 26) are mapped to grid 22 with the orientation of grid 22 and not that of the source array then being mapped. In this mapping process, each time that a grid 22 element receives a bin, then a corresponding element in temporary array 54 is "set" to so indicate. Temporary array 54 is then checked for any "unset" or unfilled elements. In temporary array 54, circle 56 represents the range of weather data in the weather radar product then being mapped. All array 54 elements within circle 56 are to receive a data bin or value from the corresponding product array being mapped to the grid 22. If an array element of array 54 is found that has not been so "set", then a back calculation is performed to find the filled data bin that is closest in location to that array element. That data bin x, y and its corresponding grid location x, y are added to the look-up table to fill the hole that would otherwise result in mosaic grid 22.

To perform the process of FIG. 4, a two-part process to build mosaics is needed. The first of these two parts, shown in FIGS. 8A–8E, can be executed off-line and is responsible for the generation of look-up tables which are built and stored in a local database 46. The second part, which is designed to run in real time and uses the prebuilt look-up tables to actually build the mosaic(s), is shown in FIGS. 9A–9E.

In FIGS. 8A–8E, the process to build site-specific look-up tables can be summarized as follows. The following process is conducted for each radar site, with a separate table being constructed for each radar site. Each element in temporary array 54 is first initialized to reflect a "blank" or cleared value. For each element in the temporary array, the element x, y coordinates are converted to distance or range from the radar site; if this range is within the radar data coverage area defined by circle 56, then a marker accompanying that temporary array element in the database is given an "unset" indication. For each radar data bin location of the radar product then being mapped, the bin x, y coordinate is converted to latitude and longitude; the resulting bin latitude and longitude is converted to a grid x, y location; the resulting bin x, y and grid x, y pair so found is assigned to an appropriate location in the look-up table for that site; the temporary array element x, y location is computed for that pair; and the temporary array element at that x, y location so found is given a "set" indication, showing that no hole is present at that location. Thereafter, the following steps are performed for each element in the temporary array 54. It is first determined whether that temporary array element is unset and thus is in the radar data coverage area but without a radar data bin assigned to it. If so, then the temporary array element x, y coordinates are converted to grid x, y coordinates; the resulting grid x, y coordinates are converted to latitude and longitude; the resulting latitude and longitude values are converted to radar bin x, y coordinates; and the resulting bin x, y coordinate and grid x, y coordinate pair are assigned to the look-up table for that single site radar product, to fill or to partially fill a hole in the mosaic grid. Finally, the resulting look-up table is assigned to a file in the database 46.

The process of FIG. 9 to build a radar data mosaic using the look-up tables can be summarized as follows. First, for each location or element in the large grid 22, that grid element is initialized to a suitable predetermined value. Then, the following steps are performed for each radar site. The latest weather radar data product for that site is read in from the database. That radar product is then decoded, and individual data values from that product are assigned to a two-dimensional array. The corresponding prebuilt look-up table is then read in from the database 46. Then, for each entry in that look-up table, extract the corresponding bin x, y coordinate and its corresponding grid x, y coordinate from the look-up table. The product data value at that bin x, y location is then extracted from the decoded radar product. That product data value is then assigned to the corresponding grid x, y location obtained from the look-up table. These last three steps are repeated for each entry in that look-up table. Finally, the resulting combined radar data in the grid is encoded and saved to file in the database 46.

FIGS. 8A, 8B, 8C, 8D and 8E together show a structure diagram or flowchart for a method of building look-up tables. These look-up tables are essential components for the method of FIG. 4 and of its corresponding system for building mosaics of radar data in real time such as on a general purpose digital computer. The method of FIGS. 8A–8E can be implemented as a computer software program that preferably can be run offline when time is not critical, so that time-consuming computations are performed in the look-up table building process and thus well before the results of those computations would be needed.

Figure 8A:
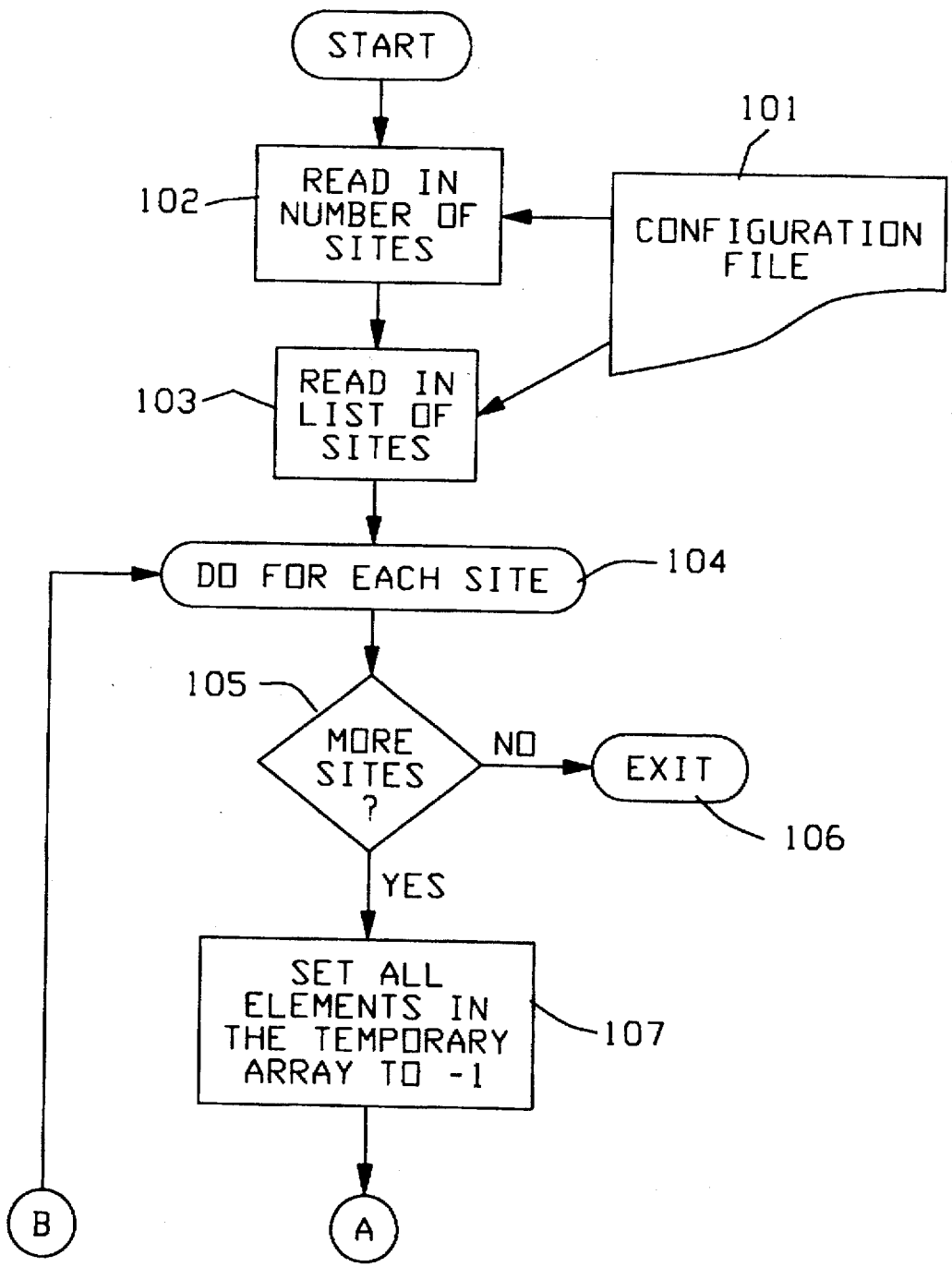

As shown in FIG. 8A, the program uses a manually created configuration file 101 that contains information on one or more sites for which a look-up table is to be built. Configuration file 101 contains the number of sites, and the latitude/longitude and a site I.D. number of each site. At step 102, the program reads the number of sites from file 101, and at step 103 reads in the site information from file 101 and stores that in the computer's memory for later use. Then, at step 104, the program enters a loop to process each such site on that list. This loop is executed until all sites are processed (determined at step 105), at which time the program terminates (step 106). The processing by that loop for each site begins at step 107 with the initialization of the temporary array by assigning the value of −1 to all elements of that array.

Figure 8B:
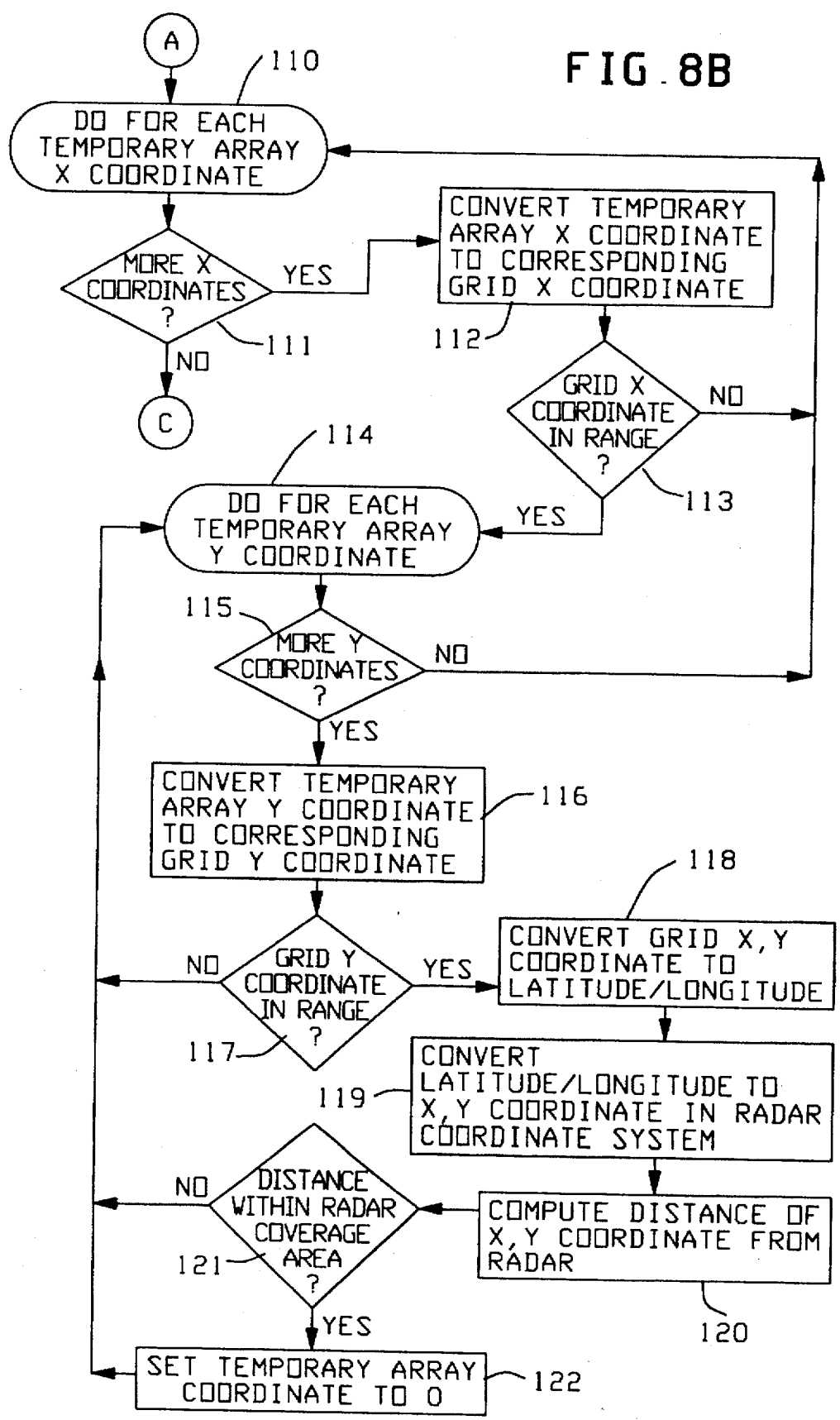

Next, the temporary array is set up by the program, as shown by FIG. 8B, to indicate which elements of that temporary array are located within the radar coverage area. At step 110, this program loops for each x coordinate in the temporary array until all x coordinates are processed (determined at step 111). In this second loop, the temporary array x coordinate then being processed is converted at step 112 to the corresponding grid array x coordinate. At step 113, it is then determined whether the resulting grid x coordinate is outside of the boundary of the grid; if so, then the program skips to the next temporary array x coordinate (steps 110, 111 and 112). This could occur for sites located near the east or west edges of the grid (for example of the region of interest) where the temporary array 54 extends beyond the edge of the grid 22. Otherwise, for a valid grid x coordinate, the program proceeds to another loop starting at step 114 for each y coordinate in the temporary array until all y coordinates are processed (step 115). At step 116, the temporary array y coordinate then being considered by this third loop is converted to the corresponding grid array y coordinate. If at step 117 the resulting grid y coordinate is found to be outside of the boundary of the grid, then the program skips to the next temporary array y coordinate (steps 114, 115 and 116). That could occur for sites located near the north or south edges of the grid (or of the geographic region of interest) where the temporary array extends beyond the edge of the grid. Otherwise, for a valid grid y coordinate, at step 118 the grid x, y position found by steps 112 and 116 is converted to latitude and longitude by using the projection equations that define the particular grid being used. For example, Lambert conformal projection equations could be used for this purpose. Since a grid is treated as being flat, but is used to represent a curved surface, some projection will be used to transform the grid into the curved surface or vice versa; various ways to accomplish such projection are well known to cartography. At step 119, the latitude and longitude is then converted to x and y coordinate values for the radar coordinate system, i.e. the coordinate system for the single site radar product. For step 119, an appropriate cartographic (or the like) conversion from latitude and longitude to the coordinate system of the radar product array is needed. The opposite such conversion was accomplished at step 118, except that as discussed above, the grid coordinates would not necessarily correspond to those of the single site radar product array. The x coordinate and y coordinate found at step 119 is then used at step 120 to compute the distance (in the radar product array) of the location defined by the x, y coordinate from the radar site. At step 121, it is determined whether the distance found at step 120 is within the radar coverage area such as is defined by circle 16 of FIG. 1; if so, then the value of the temporary array element, defined by the x, y coordinate utilized at steps 112 and 116, is set to zero at step 122, to indicate that the corresponding radar bin value is defined by the single site radar product array. Either way, the program goes on to the next y coordinate at step 114.

Figure 8C:
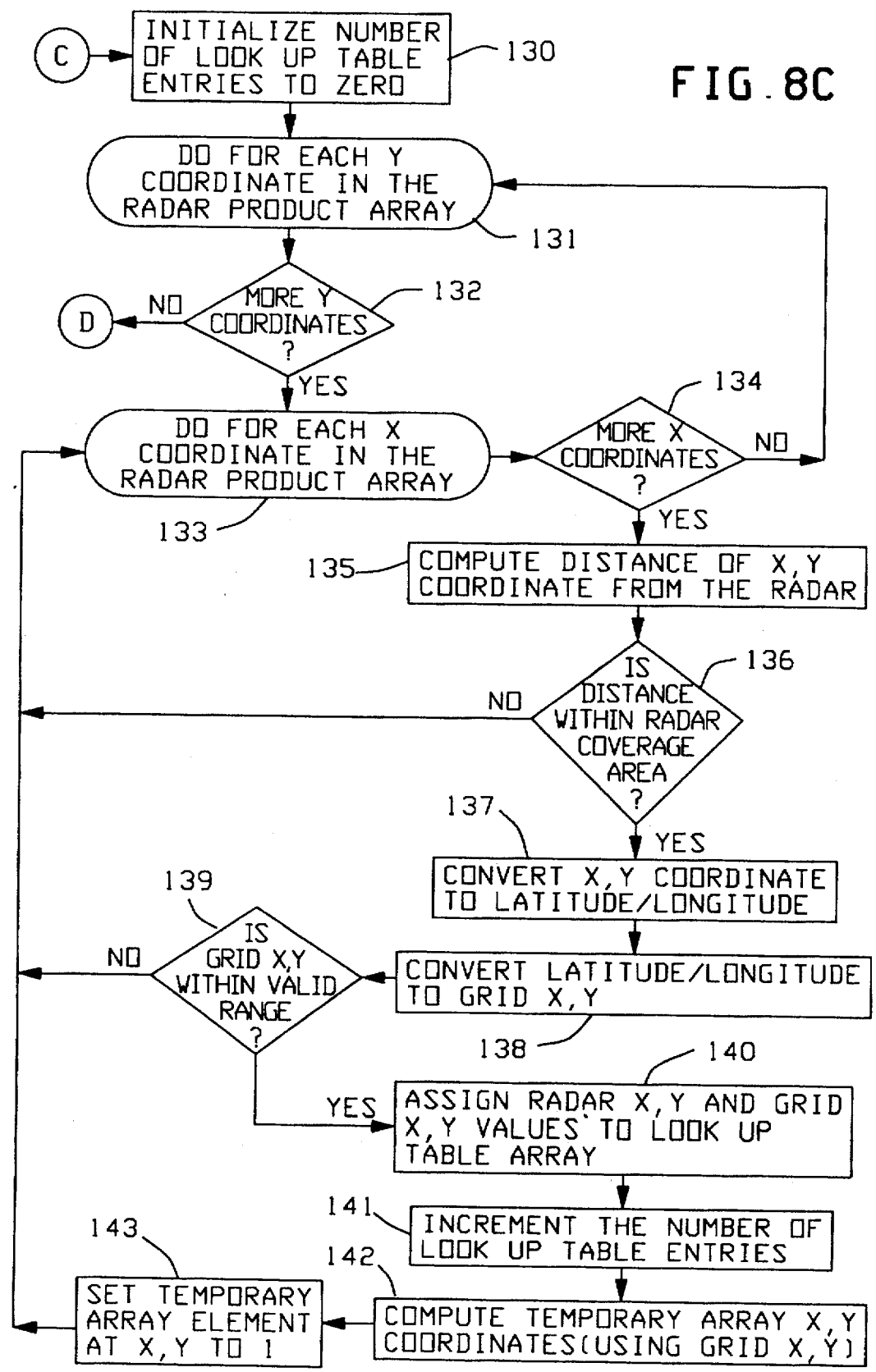

Once the temporary array is set up by the method of FIG. 8B to identify the elements that fall within the radar coverage area, generation of the look-up table proceeds, as shown by FIG. 8C. As shown in FIG. 8C, generation of the look-up table begins at step 130, where the number of lookup table entries is set to zero. Starting at step 131, the program then performs a loop for each y coordinate in the radar product raster array until all y coordinates in that array are processed (step 132). For each iteration of the loop beginning at step 131, the program performs a loop starting at step 133 for each x coordinate in the radar product raster array; this loop is exited at step 134 to return to step 131 when all x coordinates in the radar product raster array are processed by the loop beginning at step 133. In the loop beginning at step 133, using the current product raster array x, y coordinate, the distance of that coordinate (in that array) from the radar site is determined at step 135. At step 136, it is determined whether the distance computed at step 135 is outside of the radar coverage area; if so, then the program skips to the next x, y position by returning to step 133. Otherwise, the position is within the radar coverage area and further processing is performed, as shown in FIG. 8C. In this further processing, at step 137 the x, y coordinate then being processed is first converted to latitude/longitude. As used herein, coordinate or position refers to an x-value and a y-value that together (such as Cartesian coordinates) define a location in a system, array, grid, surface, or the like. At step 138, that resulting latitude/longitude is then converted to the corresponding grid coordinate system x, y position. At step 139, the resulting grid x, y coordinate is checked for validity. If at step 139 it is found that the grid x, y position found at step 138 is invalid (not within the preset grid boundaries), then those coordinates do not belong in the look-up table then being constructed, and the program skips, to the next element in the radar product array being processed, by returning to step 133. Otherwise, at step 140 the radar product raster array x, y coordinate, and the corresponding grid x, y coordinate found at step 138 for that radar x, y coordinate, are assigned to the look-up table array then being formed in the computer's memory. At step 141, the total number of look-up table entries for that look-up table is then incremented by one; recall that before the program entered the step 131 loop, that number had been initialized to zero at step 130. After step 141, the grid x, y coordinate found at step 138 and entered in the look-up table at step 140 is used at step 142 to compute the temporary array x, y coordinate corresponding to that grid x, y coordinate. At step 143, the value of the temporary array element at that x, y position is set to the value of +1, to indicate that the corresponding grid box received at least one data value from the radar product raster array. The program then returns to step 133. If at step 132 it is found that all of the y coordinates in the radar product array have been processed by the loop beginning at step 131, then the program proceeds to the process shown at FIG. 8D.

Figure 8D:
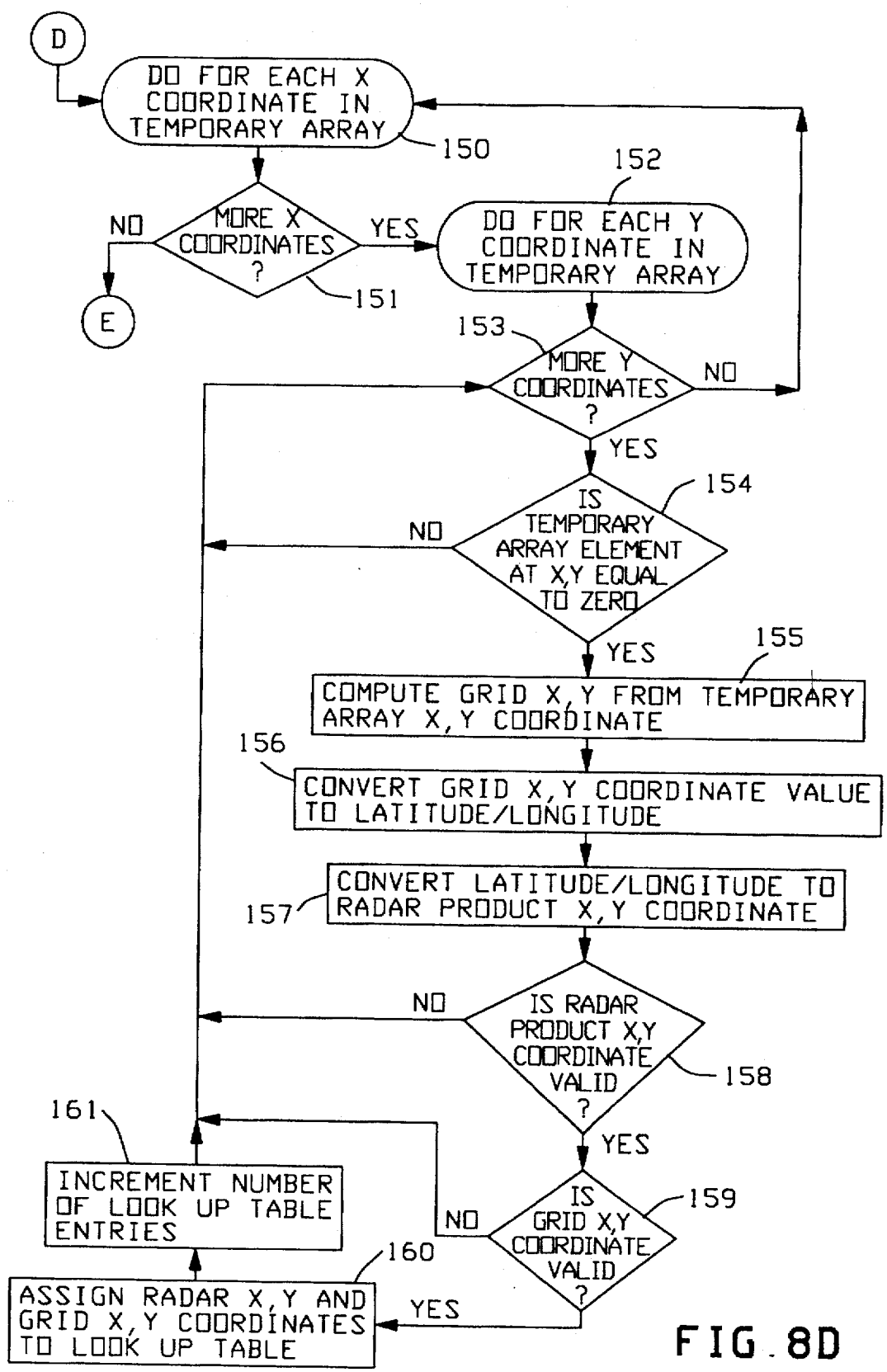

After all elements in the radar product raster array have been processed by the method of FIG. 8C, then the program locates all grid boxes within the radar coverage area that were not matched up with a coordinate or position from the radar product raster array, as shown in FIG. 8D. This is accomplished by searching the temporary array for all unset elements given the value of zero at step 122 of FIG. 8B. In FIG. 8D, a loop beginning at step 150 is performed for each x coordinate in the temporary array until there are no more x coordinates to process (step 151). Within that loop, another loop beginning at step 152 is performed for each y coordinate for the x coordinate then being considered by the step 150 loop until all such y coordinates are processed (step 153). In this other loop, after it is determined at step 153 whether there still remains any y coordinates to so process, at step 154 the value at the current x, y location in a temporary array is evaluated. At step 154, it is determined whether the temporary array element at the x, y location then being addressed by the two FIG. 8D loops is equal to zero. If the value of that location is non-zero, then it is either outside of the radar coverage area or else it has been matched with a radar data bin location. Otherwise, when the value at that x, y location is still unset (in this example, assigned a value of zero), then a hole exists in the mosaic. For each such hole, a match is needed to the radar data bin coordinate closest in position to that hole. If such a hole exists, then the grid x, y coordinate is determined at step 155 from the temporary array x, y coordinate considered at step 154. At step 156, the resulting grid x, y coordinate is converted to latitude/longitude using the equations (discussed above) that define the grid projection. That latitude/longitude found in step 156 is then converted at step 157 to the closest x, y coordinate in the radar product array coordinate system. At step 158, it is determined whether the radar product x, y coordinate found at step 157 is valid; if not, then the process returns to step 153. At step 159, it is then determined whether the grid x, y coordinate determined at step 155 is valid; if not, then the process returns to step 153. If the radar product x, y coordinate is valid and the grid x, y coordinate is valid (i.e., they fall within the region of interest), then at step 160 those coordinates are assigned to the lookup table array in the next available location in that array. Should an invalid such coordinate occur, the process then skips to the next temporary array element at step 153. After the radar product x, y coordinate and the corresponding grid x, y coordinate are added to the lookup table array, at step 161 the total number of entries in the lookup table is incremented by one. From step 161, the process returns to step 153. If no further y coordinate(s) is (are) present, then the process returns to step 150 so that the next x coordinate can be addressed in the manner described above for FIG. 8D. If no more such x coordinates remain to be processed, then the program goes from step 151 to step 170 of FIG. 8E.

Once the lookup table is completed in the manner shown in FIG. 8D, the program saves the table so determined in a file such as on the computer's disk in the manner shown in FIG. 8E. First, a unique file name for the lookup table is created at step 170 associating the current site ID number with the file. At step 170, the file is then opened for output. At step 172, the program then builds a lookup table header in memory containing, among other information, the number of entries in the table, determined at steps 130, 141 and 161. The program then writes to the new lookup table file 173 at steps 174 and 175. First, the header built at step 172 is written at step 174 to the lookup table file 173, followed at step 175 by the complete lookup table. At step 176, the lookup table file 173 is then closed. The program then returns to step 104 of FIG. 8A to continue processing until lookup tables for all sites in the site list are complete. It is only necessary to rerun the program of FIGS. 8A–8E if one or more sites are moved or added to the mosaic; real time running of the program of FIGS. 8A–8E is not needed.

Construction of a look-up table according to the present invention can be implemented in software. An example of such software, written in the Microsoft version of the C language, is given in the following pages. However, other programming languages can be used for this purpose. FIGS. 8A–8E together generally show a flowchart for this software.

```
/************************************************************
** UNISYS WIS MOSAIC PROCESSING SYSTEM
** Copyright 1994 Unisys Corporation
**
** PROGRAM NAME: CR_LUT.EXE
**
** DESCRIPTION:Read in the configuration file and build a lut for each site.
**     Maps Composite Reflectivity Product 36 and 38 to a 4x4km National grid.
** DATA FILES NEEDED:
**                  CONFIG.DAT ( Binary data file of sites for which lut files are
```

```
**                             to be built. Created by the config.exe program.
**                             Located in the local directory.)
**
** OUTPUT FILES CREATED:
**              CR4_???.LUT (Maps NEXRAD Composite Ref products to 4x4km grid.
**                           There must be one for each NEXRAD site.)  The ???
**                           represents the NEXRAD site id number.
**
******************************************************/ include <math.h>
include <stdio.h>
#include <stdlib.h>
#include <string.h>
#include <limits.h>
#include <memory.h>
#include <dos.h>
#include <fcntl.h>
#include <io.h>
#include <sys\types.h>
include <sys\stat.h> define MAXWRITE 65534 define NODATA 0
define MIN_NUM 0
#define MIN_VALUE 0
#define NO_VALUE 0
#define MIN_X 0
define MIN_Y 0 define GRID_X_SIZE_4KM 1280
define GRID_Y_SIZE_4KM 896 define LUT_MAX 190000 define GRID_X_HALF_4KM 640
define GRID_Y_HALF_4KM 448 define PR_BINS_CR4 232
define PR_ROWS_CR4 232
#define TMP_X_SIZE_CR4 250
#define TMP_Y_SIZE_CR4 250
define TMP_HALF_CR4 125 define BIN_X_IDX 0
define BIN_Y_IDX 1
#define GRID_X_IDX 2
#define GRID_Y_IDX 3
define LUT_WIDTH 4 define M_PI   3.14159265358979323846
define M_PI_2 1.57079632679489661923
define M_PI_4 0.78539816339744830962 long lut_key = {123456};
typedef struct{
    long keyword;
    long num_entries;
    short header_size;
    short site_id;
    short version;
    short date_built;
    unsigned long time_built;
    short grid_res;
    short grid_width;
    short grid_height;
```

```
    short bin_res;
    short bin_width;
    short bin_height;
    short projection;
    double grid_center_phi;
    double grid_center_lamda;
    double radar_phi;
    double radar_lamda;
} lut_header_format;

lut_header_format lut_header;

typedef struct{
    double dx;
    double dy;
    double phi_org;
    double lamda_org;
    double phi_value;
    double lamda_value;
    short x;
    short y;
    short pr_id;
    short grid_id;
} coords;

define MAX_SITES 200 long site_key = {24680};
short nexrad_site = {1};
short rrwds_site = {2};
short yes = {1};
short no = {0};

typedef struct{
    long keyword;
    short num_sites;
} site_header_format;

site_header_format site_file_header;

typedef struct{
    short site_id;
    short site_flag;
    short site_build_lut;
    short site_use;
    double site_lat;
    double site_lon;
    char site_char[8];
}site_contents_format;

site_contents_format site_file_contents[MAX_SITES];

double max_range = {464.0};

double phi_center_deg = 38.0;
double lamda_center_deg = -98.0;

/*
** Prototypes.
*/ short rnd_off(double fl);
int l_c_km2latlon( coords *l_coords );
int l_c_latlon2km( coords *l_coords );
int l_c_latlon2grid( coords *l_coords );
int l_c_grid2latlon( coords *l_coords );
int nex_km2latlon( coords *l_coords );
```

- 21 -

```c
int nex_latlon2km( coords *l_coords );
int nex_latlon2bin( coords *l_coords );
int nex_bin2latlon( coords *l_coords );
long huge_fwrite( void _huge *buffer, long length,
    size_t count, int fhw);

/*
** Main program.
*/ int  main()
{
int status;
unsigned int dos_status;
long nread;
size_t nwrite;
long size_write;
short bin_x;
short bin_y;
short num_sites;
short j;
long lut_size;
char lut_name[100];
static short  _huge lut[LUT_MAX][LUT_WIDTH];
long entry;
short tmp_init = {-1};
short tmp_unset = {0};
short tmp_set = {1};
short good_status = {0};
double range;
short  grid_x;
short  grid_y;
double phi_deg;    /* "Object" latitude (degrees). */
double lamda_deg;  /* "Object" longitude (degrees). */
double phi_radar_deg;   /* Radar latitude (degrees). */
double lamda_radar_deg;/* Radar longitude (degrees). */
static short  _huge tmp[TMP_X_SIZE_CR4][TMP_Y_SIZE_CR4];
short tx,ty;
double nx,ny;
short grid_radar_x,grid_radar_y;
coords dummy_coords;
coords *local_coords;

FILE * fpr;
int fhw;

/*
** Initialize the local_coords "pointer" so that
** it points somewhere.
*/ local_coords = &dummy_coords;

/*
** Open the configuration file for "read binary".
*/ fpr=fopen("config.dat","rb");
if(fpr==NULL)
{
    (void)printf("Error opening the configuration file.\n");
    return(1);
}

/*
** Read in the configuration file header.
*/
```

- 22 -

```
nread=fread(&site_file_header,sizeof(site_header_format),1,fpr);
if(nread==NODATA)
{
    (void)printf("Error reading the configuration file header.\n");
    return(1);
}

/*
** Check the configuration file header for the correct keyword
** and exit the program if the keyword does not agree.
*/ if( site_file_header.keyword != site_key )
{
    (void)printf("Invalid configuration file keyword\n");
    return(1);
}

/*
** Extract the number of sites from the configuration file header
*/ num_sites = site_file_header.num_sites;

/*
** Print the maximum number of sites.
*/

(void)printf("\nbuilding mosaic look up tables for %d sites\n\n",num_sites);

/*
** Read in the contents of the configuration file.  The amount to be read in
** is determined by the number of sites and the size of the structure for
** each site.
*/ nread=fread(site_file_contents,num_sites*sizeof(site_contents_format),1,fpr);
if(nread==NODATA)
{
    (void)printf("config.dat: fread (contents) error\n");
    return(1);
}

/*
** Close the configuration file.
*/ status = fclose(fpr);
if( status )
{
    (void)printf("Error closing the configuration file.\n");
    return(1);
}

/*
** Loop through all of the sites and build a lut for each.
*/ for (j=MIN_NUM; j<num_sites; j++)
{
    if( (site_file_contents[j].site_flag == nexrad_site)&&
        (site_file_contents[j].site_build_lut == yes) )
    {
        /*
        ** Initialize the temporary array with the following.
        ** The array is initialized by setting every array element.
        ** This array is used to determine where holes exist in the
```

```
** initial mapping of NEXRAD data bins to the national mosaic.
*/ for (tx=MIN_X; tx<TMP_X_SIZE_CR4; tx++)
{
    for(ty=MIN_Y; ty<TMP_Y_SIZE_CR4; ty++)
    {
        tmp[tx][ty]=tmp_init;
    }
}

/*
** Extract the radar site latitude and longitude and assign the
** values to simple variables and assign to the local_coords structure.
*/ phi_radar_deg=site_file_contents[j].site_lat;
lamda_radar_deg=site_file_contents[j].site_lon;

local_coords->phi_value = phi_radar_deg;
local_coords->lamda_value = lamda_radar_deg;

/*
**  Print the site id and radar latitude/longitude.
*/

(void)printf("file# %3.3d NEXRAD site: %3.3d ",j,site_file_contents[j].site_id);
(void)printf("  radar lat/lon: %f/%f (deg)\n",
        phi_radar_deg,lamda_radar_deg);

/*
** Convert the radar latitude/longitude of the current site to an x,y
** coordinate in the national grid with the following routine
** (which uses the Lambert conformal projection).  The x and y
** coordinates are stored in the simple variables: grid_radar_x, grid_radar_y.
*/ status=l_c_latlon2grid( local_coords );
if(status)
{
    (void)printf("Error from l_c_latlon2grid: status=%d\n",status);
    return(1);
} grid_radar_x = local_coords->x;
grid_radar_y = local_coords->y;

/*
** Next, unset the array elements which fall inside of the
** range of the radar.  This is done because this is the region
** which must be checked for "holes" left by mapping NEXRAD bins to
** the grid.  First, loop through the temporary array in the x direction.
*/ for (tx=MIN_X; tx<TMP_X_SIZE_CR4; tx++)
{
    /*
    ** Convert the temporary array x coordinate to the corresponding
    ** grid box x coordinate.
    */ grid_x=(grid_radar_x - TMP_HALF_CR4 + tx);

/*
    ** Check that the x grid coordinate falls in the array.
    ** Otherwise, the position is just skipped.
    */
```

- 24 -

```c
if((grid_x>=MIN_X)&&(grid_x<GRID_X_SIZE_4KM))
{
    /*
    ** Loop through all of the y bins in the temporary array.
    */ for(ty=MIN_Y; ty<TMP_Y_SIZE_CR4; ty++)
    {
        /*
        ** Convert the temporary array y coordinate to the
        ** corresponding grid box y coordinate.
        */ grid_y=(grid_radar_y - TMP_HALF_CR4 + ty);

/*
        ** Check that the y grid coordinate falls in the array.
        ** Otherwise, the position is just skipped.
        */ if((grid_y>=MIN_Y)&&(grid_y<GRID_Y_SIZE_4KM))
        {
            /*
            ** Convert the x,y grid box coordinate to
            ** a latitude longitude value.
            */ local_coords->x = grid_x;
            local_coords->y = grid_y;

status = l_c_grid2latlon( local_coords );

phi_deg = local_coords->phi_value;
            lamda_deg = local_coords->lamda_value;

/*
            ** Then convert that latitude longitude position
            ** to an x,y position in km's from the radar in
            ** the NEXRAD coordinate system.
            */ local_coords->phi_value = phi_deg;
            local_coords->lamda_value = lamda_deg;
            local_coords->phi_org = phi_radar_deg;
            local_coords->lamda_org = lamda_radar_deg;

status = nex_latlon2km( local_coords );

/*
            ** Then use the x,y coordinate in km's to determine the
            ** actual distance from the radar in km's.  Unset the
            ** temporary array value if the distance is within the
            ** range of the product.
            */ nx = local_coords->dx;
            ny = local_coords->dy;

range=sqrt((nx*nx)+(ny*ny));
            if(range<max_range)
            {
                tmp[tx][ty]=tmp_unset;
            }
        }
    }
}
}
```

```
/*
** The look up table is built here.  The first step is to "map"
** each NEXRAD bin to a grid x,y coordinate.  The overall approach
** is to convert the bin location to latitude/longitude and then
** convert that latitude/longitude to a grid x,y coordinate
** (which is in the Lambert conformal projection).  The look up
** table consists of a list of entries, each containing a NEXRAD
** bin and row coordinate and the corresponding grid x and y coordinate.
** Later on, in the second step, holes in the grid are found and the
** closest NEXRAD bin is mapped to the grid x,y coordinate of the hole.
*/

/*
** Initially, there are no entries in the look up table.
*/ entry=NO_VALUE;

/*
** Assign the radar latitude longitude value of the current site
** to the local_coords structure.
*/ local_coords->phi_org = phi_radar_deg;
local_coords->lamda_org = lamda_radar_deg;

/*
** Loop for each NEXRAD bin in the product.  The outer loop
** handles each row of data.
*/ for(bin_y=MIN_Y; bin_y<PR_ROWS_CR4; bin_y++)
{
    /*
    ** The inner loop handles each bin in a row.
    */ for(bin_x=MIN_X; bin_x<PR_BINS_CR4; bin_x++)
    {
        /*
        ** For the current bin, which is in the NEXRAD
        ** coordinate system, determine the latitude longitude.
        */ local_coords->x = bin_x;
        local_coords->y = bin_y;

status=nex_bin2latlon( local_coords );

phi_deg = local_coords->phi_value;
        lamda_deg = local_coords->lamda_value;

if(status==good_status)
        {
            /*
            ** For a valid x and y bin, take that latitude/longitude
            ** and compute the corresponding grid x,y coordinate.
            */ local_coords->phi_value = phi_deg;
            local_coords->lamda_value = lamda_deg;

status=l_c_latlon2grid( local_coords );

grid_x = local_coords->x;
            grid_y = local_coords->y;
```

```
                                - 26 - if(status==good_status)
            {
                /*
                ** For a valid latitude/longitude, the corresponding
                ** bin x,y and grid x,y coordinates are assigned to the
                ** look up table array and the number of entries
                ** is incremented.
                */ lut[entry][BIN_X_IDX]  = bin_x;
                lut[entry][BIN_Y_IDX]  = bin_y;
                lut[entry][GRID_X_IDX] = grid_x;
                lut[entry][GRID_Y_IDX] = grid_y;

entry++;

/*
                ** Then the grid x,y coordinate is used to compute the
                ** temporary array x,y coordinate.  If the temporary
                ** array x,y coordinate is valid for the array, then
                ** the array element is set.  Any unset array elements
                ** represent "holes" which will be handled later.
                */ tx=grid_x - grid_radar_x + TMP_HALF_CR4;
                ty=grid_y - grid_radar_y + TMP_HALF_CR4;

if((tx>=MIN_X)&&(tx<TMP_X_SIZE_CR4)&&
                            (ty>=MIN_Y)&&(ty<TMP_Y_SIZE_CR4))
                {
                    tmp[tx][ty]=tmp_set;
                }
            }
        }
    }
}
/*
** In the next step, go through the temporary array and find any unset
** array elements which represent grid boxes within the product
** coverage area that did not already receive a bin.  For each of those
** grid coordinates, find the closest NEXRAD data bin and "map" it to
** the grid.  This is where the holes are filled.  Additional entries
** are made to the look up table for each set of NEXRAD bin,row and
** corresponding grid x,y coordinates.
*/ for (tx=MIN_X; tx<TMP_X_SIZE_CR4; tx++)
{
    for(ty=MIN_Y; ty<TMP_Y_SIZE_CR4; ty++)
    {
        /*
        ** Check the current temporary array element to determine if
        ** there is a hole with the following.  (Otherwise, the loop just
        ** goes on to the next element.)
        */ if( tmp[tx][ty]==tmp_unset )
        {
            /*
            ** Convert the temporary array x,y coordinate to a grid x,y
            ** coordinate.
            */ grid_x=(grid_radar_x - TMP_HALF_CR4 + tx);
            grid_y=(grid_radar_y - TMP_HALF_CR4 + ty);
```

- 27 -

```
/* Convert the grid x,y coordinate to the corresponding
** latitude/longitude.
*/ local_coords->x = grid_x;
local_coords->y = grid_y;

status = l_c_grid2latlon( local_coords );

phi_deg = local_coords->phi_value;
lamda_deg = local_coords->lamda_value;

if(status == good_status)
{
    /*
    ** For a valid grid x,y coordinate, convert the
    ** latitude/longitude to the corresponding (closest)
    ** NEXRAD data bin (store in: bin_x, bin_y).
    */ local_coords->phi_value = phi_deg;
    local_coords->lamda_value = lamda_deg;
    local_coords->phi_org = phi_radar_deg;
    local_coords->lamda_org = lamda_radar_deg;

status = nex_latlon2bin( local_coords );

bin_x = local_coords->x;
    bin_y = local_coords->y;

if(status == good_status)
    {
        if((bin_x>=MIN_X)&&(bin_x<PR_BINS_CR4)&&
            (bin_y>=MIN_Y)&&(bin_y<PR_ROWS_CR4)&&
            (grid_x>=MIN_X)&&(grid_x<GRID_X_SIZE_4KM)&&
            (grid_y>=MIN_Y)&&(grid_y<GRID_Y_SIZE_4KM))
        {
            /*
            ** When the bin coordinates and the grid x,y
            ** coordinates are valid, then assign those
            ** coordinate pairs to the look up table array
            ** and increment the number of entries.
            */ lut[entry][BIN_X_IDX]=bin_x;
            lut[entry][BIN_Y_IDX]=bin_y;
            lut[entry][GRID_X_IDX]=grid_x;
            lut[entry][GRID_Y_IDX]=grid_y;
            entry++;

/*
            ** Check the number of entries to determine if the
            ** unlikely condition has occurred that the look up table
            ** is full.  In that case, print a message and break
            ** out of the loop.
            */ if(entry == LUT_MAX)
            {
                (void)printf("LUT is full: entry=%d\n",entry);
                goto lut_full;
            }
        }
    }
}
}
}
}
```

- 28 -

```
}
lut_full:;   /* The goto branches here to break from loop. Do nothing. */ ;
/*
** Create the look up table (lut) file name in which the site id number
** is embedded with the following.
*/

(void)sprintf(lut_name,"cr4_%3.3d.lut\0",site_file_contents[j].site_id);

/*
** Print the lut file name.
*/

(void)printf("      look up table written to %s\n\n",lut_name);

/*
** Create and Open the lut file for "write".
*/

_fmode = O_BINARY;

fhw=creat(lut_name,S_IWRITE);
if(fhw==-1)
{
    (void)printf("Error creating lut file: %s\n",lut_name);
    return(1);
} lut_header.keyword = lut_key;
lut_header.num_entries = entry;
lut_header.header_size = sizeof(lut_header_format);
lut_header.site_id = site_file_contents[j].site_id;
lut_header.version = 1;
lut_header.date_built = 0;
lut_header.time_built = 0;
lut_header.grid_res = 4;
lut_header.grid_width = GRID_X_SIZE_4KM;
lut_header.grid_height = GRID_Y_SIZE_4KM;
lut_header.bin_res = 4;
lut_header.bin_width = PR_BINS_CR4;
lut_header.bin_height = PR_ROWS_CR4;
lut_header.projection = 1;
lut_header.grid_center_phi = phi_center_deg;
lut_header.grid_center_lamda = lamda_center_deg;
lut_header.radar_phi = phi_radar_deg;
lut_header.radar_lamda = lamda_radar_deg;

/*
** Write the lut file header structure to the lut file
** with the following.
*/ dos_status = _dos_write(fhw,&lut_header,(size_t)sizeof(lut_header_format),&nwrite);
if(dos_status)
{
    (void)printf("Error writing lut file header: %s\n",lut_name);
    return(1);
} if(nwrite==NODATA)
{
    (void)printf("Error writing lut file header. nwrite = %d\n",nwrite);
    return(1);
}

/*
```

- 29 -

```
    ** Compute the size of the lut file contents based on the number
    ** of entries and number of bytes per entry.
    */ lut_size = entry*LUT_WIDTH*sizeof(short);

/*
        ** Write the lut file contents to the lut file
        ** with the following.
        */ size_write =huge_fwrite(lut, lut_size,1,fhw);

if(size_write==NODATA)
        {
            (void)printf("Error writing lut file contents.\n");
            return(1);
        } dos_status=close(fhw);
        if(dos_status)
        {
            (void)printf("Error closing lut file: %s\n",lut_name);
            return(1);
        }
      }
  }

/*
** Print a message indicating that processing is complete.
*/

(void)printf("normal termination -> look up tables are complete\n\n");

return(0);
}

/****************************************************************
*    function:  rnd_off( )
*    Round off a real number and assign to a short.
****************************************************************/ short rnd_off(double fl)
{
short i;
i= (fl<0.0) ? (short)ceil(fl-0.5) : (short)floor(fl+0.5) ;
return (i);
}

/****************************************************************/
int nex_km2latlon( coords *l_coords )
/*
*    Name: nex_km2latlon
*
*    Description:
*    This routine converts the x and y distance of an "object" in
*    the NEXRAD plane to the corresponding latitude and longitude
*    values in degrees.
*
*/

/*    ---------------------Input parameters--------------------- */
/*
*        phi_radar_deg        "Radar" latitude (degrees).
*        lamda_radar_deg      "Radar" longitude (degrees).
*
*        zx                   "Object" x distance from radar (in km's)
```

- 30 -

```
*                                 where x increases towards the east.
*         zy              "Object" y distance from radar (in km's)
*                                 where y increases towards the north.
*/
/* ------------------------------------------------------------ */

/* ----------------------Output parameters--------------------- */
/*
*         phi_deg           "Object" latitude (degrees).
*         lamda_deg         "Object" longitude (degrees).
*/
/* ------------------------------------------------------------ */

{
/* ----------------------Internal Variables-------------------- */
double phi;            /* "Object" latitude (radians).                */
double lamda;          /* "Object" longitude (radians).               */
double phi_radar;      /* "Radar" latitude (radians).                 */
double lamda_radar;    /* "Radar" longitude (radians).                */
double radius = {6380.};   /* Average earth radius (in kilometers).   */
double constant = {135.};  /* Constant.                               */
double deg2radians = {M_PI/180.}; /*Converts degrees to radians.      */ double zp;             /* Intermediate term.                          */
double zsin_theta;     /* Intermediate term.                          */
double zcos_theta;     /* Intermediate term.                          */
double zsin_s;         /* Intermediate term.                          */
double zcos_s;         /* Intermediate term.                          */
double zsin_phi;       /* Intermediate term.                          */
double zcos_phi;       /* Intermediate term.                          */
double lamda_delta;    /* Intermediate term.                          */
/* ------------------------------------------------------------ */
double zx;
double zy;
double phi_radar_deg;
double lamda_radar_deg;
double phi_deg;
double lamda_deg;

/*
** Extract the radar latitude/longitude (in degrees) from the l_coords
** structure.
*/ phi_radar_deg = l_coords->phi_org;
lamda_radar_deg = l_coords->lamda_org;

/*
** Extract the object position (in kilometres) from the l_coords
** structure.
*/ zx = l_coords->dx;
zy = l_coords->dy;

/* Check the x and y distances from the radar location.         */ if( ((zx>-0.1)&&(zx<0.1)) && ((zy>-0.1)&&(zy<0.1)) )
{
   /*
   * This handles the case when the x and y distances are both
   * near zero (the object is essentially at the radar).
   * Set the object latitude and longitude (in degrees) to the radar
   * latitude and longitude (in degrees).
   */
```

```
                                - 31 -
      phi_deg = phi_radar_deg;
      lamda_deg = lamda_radar_deg;
   }
   else
   {
      /*
       * This handles the case when the x or y distances are not
       * near zero (the object is not at the radar).  Compute
       * the object latitude and longitude.  First, convert the
       * radar latitude and longitude from degrees to radians.
       */ phi_radar = phi_radar_deg * deg2radians;
      lamda_radar = lamda_radar_deg * deg2radians;

/*  Compute the distance to the object (in kilometers).       */ zp = sqrt( (zx*zx) + (zy*zy) );

/*  Compute the sin and cos of the angle to the object.       */ zsin_theta = (zx/zp);
      zcos_theta = (zy/zp);

/*
       * Compute the intermediate sin and cosine terms of the angular great
       * circle distance from the radar position to the object position.
       */ zsin_s = ( (zp/radius) * ( 1.0-(( constant * zp )/
               (radius * radius))) );

zcos_s = sqrt( 1.0 - (zsin_s * zsin_s) );

/*
       * Compute the intermediate sin and cosine terms of the object
       * latitude.
       */ zsin_phi = (sin(phi_radar)*zcos_s +
                 cos(phi_radar)*zsin_s*zcos_theta);

zcos_phi = sqrt( 1.0 - (zsin_phi*zsin_phi) );

/*  Compute the difference between object and radar longitude.  */ lamda_delta = asin( zsin_s * zsin_theta / zcos_phi );

/*  Compute the object latitude and longitude (in radians).    */ phi = atan2( zsin_phi,zcos_phi );
      lamda = lamda_radar+lamda_delta;

/*  Convert the latitude and longitude from radians to degrees. */ phi_deg = (phi/deg2radians);
      lamda_deg = (lamda/deg2radians);
   }

/*
** Assign the latitude/longitude (in degrees) to the l_coords
** structure.
*/ l_coords->phi_value = phi_deg;
```

- 32 -

```
l_coords->lamda_value = lamda_deg;

/*
** Return a zero value.
*/ return(0);
}
/***************************************************************/
int nex_latlon2km( coords *l_coords )

/*
*    Name: nex_latlon2km
*
*    Description:
*        This routine converts the latitude and longitude of an "object" in
*        the NEXRAD plane to the x and y components of distance
*        in kilometers.
*/

{
/* ----------------------Input parameters---------------------- */
double phi_deg;            /* "Object" latitude (degrees).      */
double lamda_deg;          /* "Object" longitude (degrees).     */
double phi_radar_deg;      /* "Radar" latitude (degrees).       */
double lamda_radar_deg;    /* "Radar" longitude (degrees).      */
/* ------------------------------------------------------------ */

/* ----------------------Output parameters--------------------- */
double zx;                 /* "Object" x distance from radar (in km's) */
                           /* where x increases towards the east.      */ double zy;                 /* "Object" y distance from radar (in km's) */
                           /* where y increases towards the north.     */
/* ------------------------------------------------------------ */

/* ----------------------Internal Variables-------------------- */
double phi;                /* "Object" latitude (radians).               */
double lamda;              /* "Object" longitude (radians).              */
double phi_radar;          /* "Radar" latitude (radians).                */
double lamda_radar;        /* "Radar" longitude (radians).               */
double radius = {6380.};   /* Average earth radius (in kilometers).      */
double constant = {135.};  /* Constant.                                  */
double deg2radians = {M_PI/180.}; /*Converts degrees to radians.         */
double zterma;             /* Intermediate term A.                       */
double ztermb;             /* Intermediate term B.                       */
double zsin_s;             /* Intermediate term: sin of angular great circle. */
double zcos_s;             /* Intermediate term: cos of angular great circle. */
double zd;                 /* Intermediate term D.                       */
/* ------------------------------------------------------------ */ phi_deg = l_coords->phi_value;
lamda_deg = l_coords->lamda_value;

phi_radar_deg = l_coords->phi_org;
lamda_radar_deg = l_coords->lamda_org;

/* Convert the radar latitude from degrees to radians.         */ phi_radar = deg2radians * phi_radar_deg;

/* Convert the radar longitude from degrees to radians.        */ lamda_radar = deg2radians * lamda_radar_deg;

/* Convert the object latitude from degrees to radians.        */
```

- 33 -

```
phi = deg2radians * phi_deg;

/* Convert the object longitude from degrees to radians.           */ lamda = deg2radians * lamda_deg;

/* Compute intermediate terms a and b.                             */ zterma = cos(phi) * sin( lamda - lamda_radar );

ztermb = ( (cos(phi_radar) * sin(phi))-
     (sin(phi_radar) * cos(phi) * cos(lamda-lamda_radar)) );

/* Compute intermediate sine and cosine of the angular great circle
   distance from the radar position to the object position.        */ zsin_s = sqrt((zterma*zterma)+(ztermb*ztermb));

zcos_s = sqrt( 1 - (zsin_s*zsin_s) );

/* Compute intermediate term D.                                    */ zd = (constant * zsin_s) + radius;

/* Compute the x distance (in kilometers).                         */ zx = zd * cos(phi) * sin(lamda-lamda_radar);

/* Compute the y distance (in kilometers).                         */ zy = zd * (sin(phi) - (sin(phi_radar)*zcos_s)) / cos(phi_radar);

l_coords->dx = zx;
l_coords->dy = zy;

/*
** Return a zero value.
*/ return(0);
}
/*****************************************************************/
int nex_latlon2bin( coords *l_coords )
{
short bin_x, bin_y;
int status;
double zx,zy;

/*
** Convert the lattitude/longitude to kilometers in the NEXRAD
** coordinate system with the following.
*/ status = nex_latlon2km( l_coords );
if(status)
{
    return(1);
} zx = l_coords->dx;
zy = l_coords->dy;

/*
** Convert the x and y components of distance from kilometers to
** data bin coordinates.  Round off the floating point values as
** they are assigned to integer variables.
*/
```

- 34 -

```
bin_x = rnd_off( (zx+462.)/4.0 );
bin_y = rnd_off( (462.-zy)/4.0 );

/*
** Assign the x and y bin coordinates to the l_coords structure.
*/ l_coords->x = bin_x;
l_coords->y = bin_y;

/*
** Check that the x,y bin coordinate is within the valid range
** which determines the return value.  A nonzero return value
** indicates that the latitude longitude corresponds to a
** nonvalid x,y bin coordinate.
*/ if( (bin_x>=MIN_X)&&(bin_x<PR_BINS_CR4)&&
            (bin_y>=MIN_Y)&&(bin_y<PR_ROWS_CR4) )
{
    /*
    ** This handles valid x,y bin values.  A zero value is returned.
    */ return(0);
}
return(2);
}
/******************************************************************/
int l_c_latlon2grid( coords *l_coords )
{
short grid_x, grid_y;
int status;
double zx,zy;
double boxsize = {4.0};

/*
** Convert the incoming latitude longitude to a distance in
** (nominal) kilometers using the Lambert conformal projection.
*/ status = l_c_latlon2km( l_coords );
if(status)
{
    /*
    ** If a nonvalid status occurs then return from this routine
    ** with a nonzero status.
    */ return(1);
}

/*
** Extract the x,y components of distance from the l_coords structure.
*/ zx = l_coords->dx;
zy = l_coords->dy;

/*
** Convert the x,y components of distance to grid x,y coordinates.
** The values are rounded off as they are converted from floating
** point to integer.
*/ grid_x = rnd_off(zx/boxsize)+GRID_X_HALF_4KM;
grid_y = GRID_Y_HALF_4KM-rnd_off(zy/boxsize);
```

- 35 -

```c
/*
** Assign the grid x,y coordinates to the l_coords structure
** with the following.
*/ l_coords->x = grid_x;
l_coords->y = grid_y;

/*
** Check that the grid x,y coordinate values represent a valid
** array index.  Nonvalid values result in a nonzero return.
*/ if( (grid_x>=MIN_X)&&(grid_x<GRID_X_SIZE_4KM)&&
    (grid_y>=MIN_Y)&&(grid_y<GRID_Y_SIZE_4KM) )
{
    /*
    ** This handles the valid grid x,y values.  A zero value is returned.
    */ return(0);
}
return(2);
}
/****************************************************************/
int nex_bin2latlon( coords *l_coords )
{
short bin_x, bin_y;
int status;
double zx,zy;
double range;

/*
** Extract the NEXRAD data bin coordinates from the l_coords structure.
*/ bin_x = l_coords->x;
bin_y = l_coords->y;

/*
** Check the x,y coordinate pair for a valid array index value.
** A non valid coordinate reults in a non zero return from the routine.
*/ if( (bin_x>=MIN_X)&&(bin_x<PR_BINS_CR4)&&(bin_y>=MIN_Y)&&(bin_y<PR_ROWS_CR4) )
{
    /* Convert the bin x,y coordinate to the x,y components of distance
    ** where the result is a pair of floating point values.
    */ zx =  ((bin_x*4.0)-462.0);
    zy = (-((bin_y*4.0)-462.0));

/*
    ** Use the components of distance to compute the range in kilometers.
    */ range = sqrt( (zx*zx)+(zy*zy) );

/*
    ** Check the range to insure that it is in the NEXRAD coverage area.
    ** Otherwise a nonzero value is returned.
    */ if(range<max_range)
    {
        /*
```

```
** This handles the coordinates located within the NEXRAD coverage
** area.  Assign the x,y components of distance to the l_coords array.
*/ l_coords->dx = zx;
    l_coords->dy = zy;

/*
** Compute the latitude/longitude of the point with the following
** routine which converts x,y distances in the NEXRAD plane to
** latitude longitude (in degrees).
*/ status = nex_km2latlon( l_coords );
    if(status)
    {
        /* This handles a nonzero status returned indicating non valid
        ** coordinates were passed.  Return a nonzero status value.
        */ return(3);
    }

/*
    ** This indicates that valid latitude/longitude values
    ** were computed. A zero value is returned.
    */ return(0);
    }
    return(1);
}
return(2);
}
/*****************************************************************/
int l_c_grid2latlon( coords *l_coords )
{ short grid_x, grid_y;
int status;
double zx,zy;
double boxsize = {4.0};

/*
** Extract the grid x,y coordinate from the l_coords structure.
*/ grid_x = l_coords->x;
grid_y = l_coords->y;

/*
** Check that the x,y grid coordinate is a valid array index.
** Otherwise, a nonzero status is returned.
*/ if( (grid_x>=MIN_X)&&(grid_x<GRID_X_SIZE_4KM)&&
            (grid_y>=MIN_Y)&&(grid_y<GRID_Y_SIZE_4KM) )
{
    /*
    ** This handles a valid x,y grid coordinate.  Convert the x,y grid
    ** coordinate to x,y distance components in (nominal) kilometers.
    ** The y ordinate is reversed.  Then assign the distance components
    ** to the l_coords structure.
    */ zx = (grid_x - GRID_X_HALF_4KM)*boxsize;
    zy = (GRID_Y_HALF_4KM - grid_y)*boxsize;
```

- 37 -

```
    l_coords->dx = zx;
    l_coords->dy = zy;

/*
    ** Convert the x,y components of distance (in kilometers) to
    ** latitude/longitude using the Lambert conformal projection
    ** with the following routine.
    */ status=l_c_km2latlon( l_coords );
    if(status)
    {
        /* This handles the case when a nonvalid condition has occurred.
        ** A non zero value is returned.
        */ return(2);
    }

/*
    ** This handles the valid condition and a zero value is returned.
    */ return(0);
}
return(1);
}

/******************************************************************
*     function:  l_c_latlon2km( )
*     Convert latitude/longitude to x/y using Lambert Conformal.
******************************************************************/
/* Convert latitude/longitude to x/y */ int l_c_latlon2km( coords *l_coords )
{ static double deg2radians = {M_PI/180.};   /* Converts degrees to radians.       */ static double phi_1_deg = {33};   /* Standard latitude 1 (in degrees). */
static double phi_2_deg = {45};   /* Standard latitude 2 (in degrees). */ static double radius = {6380.};    /* Average earth radius (in km's).    */ static double phi_0_deg = {38.0};    /* Grid origin latitude (in degrees). */
static double lamda_0_deg = {-98.0}; /* Grid origin longitude (in degrees). */

/*
** The following constants were calculated for the grid center, earth radius,
** and standard latitudes defined above.  DO NOT use this routine for other
** centers without recalculating the constants.
*/ static double phi_1= {0.575958653158129};   /* Standard latitudes (in radians).  */
static double phi_2= {0.785398163397448};   /* Standard latitudes (in radians).  */ static double phi_0= {0.663225115757845};    /* Grid origin latitude (in radians). */
static double lamda_0= {-1.710422666954443}; /* Grid origin longitude (in radians). */ static double rho_0= {7931.823624772932817};
static double n= {0.630477697315427};
static double f= {1.955000201593793};
static double rf={12472.901286168398656};   /* Intermediate term =(radius*f)   */ double phi_deg;
double lamda_deg;
```

- 38 -

```c
double zx;
double zy;

double rho;
double theta;

double phi;         /* Current latitude value (radians). */
double lamda;       /* Current longitude value (radians). */
/*
** Extract the latitude and longitude of the object (in degrees) from
** the l_coords structure.
*/ phi_deg = l_coords->phi_value;
lamda_deg = l_coords->lamda_value;

/*
** Convert the latitude and longitude of the object from
** degrees to radians.
*/ phi = phi_deg*deg2radians;
lamda = lamda_deg*deg2radians;

rho = ( rf/(pow(tan(M_PI_4 + (phi/2)),n)) );

theta = n*(lamda - lamda_0);

/*
** Compute the x and y components of distance (nominally in kilometers).
*/ zx = (rho*sin(theta));
zy = (rho_0 - rho*cos(theta) );

/*
** Assign the x,y distance components (nominally in kilometers)
** to the l_coords structure.
*/ l_coords->dx = zx;
l_coords->dy = zy;

/*
** Return a zero value.
*/ return(0);
}
/*************************************************************/
int l_c_km2latlon( coords *l_coords )

/*
*   Name: l_c_km2latlon
*
*   Description:
*   This routine converts the x and y distance components of an "object"
*   in the Lambert Conformal projection to the latitude and longitude
*   in degrees.
*
*/

/* ---------------------Input parameters--------------------- */
/* *zx         "Object" x distance from radar (in km's)        */
/*             where x increases towards the east.             */
/*                                                             */
```

- 39 -

```
/* *zy       "Object" y distance from radar (in km's)            */
/*            where y increases towards the north.               */
/* ------------------------------------------------------------- */

/* -----------------------Output parameters--------------------- */
/* phi_deg    "Object" latitude (degrees).                       */
/* lamda_deg  "Object" longitude (degrees).                      */
/* ------------------------------------------------------------- */
{
static double phi_1= {0.575958653158129};   /* Standard latitudes (in radians). */
static double phi_2= {0.785398163397448};   /* Standard latitudes (in radians). */ static double phi_0= {0.663225115757845};    /* Grid origin latitude (in radians). */
static double lamda_0= {-1.710422666954443}; /* Grid origin longitude (in radians). */ static double rho_0= {7931.823624772932817};
static double n= {0.630477697315427};
static double f= {1.955000201593793};
static double rf={12472.901286168398656};   /* Intermediate term =(radius*f)  */ static double radius = {6380.};   /* Average earth radius (in kilometers).  */
static double deg2radians = {M_PI/180.}; /*Converts degrees to radians.     */ static double phi_1_deg = {33};   /* Standard latitude 1 (in degrees). */
static double phi_2_deg = {45};   /* Standard latitude 2 (in degrees). */ static double phi_0_deg = {38.0};
static double lamda_0_deg = {-98.0};

/* -----------------------Internal Variables-------------------- */
double phi;       /* "Object" latitude (radians).                */
double lamda;     /* "Object" longitude (radians).               */
double rho;
double theta;

double zx, zy;
double phi_deg;
double lamda_deg;

/* ------------------------------------------------------------- */

/*
** Extract the object distance (in km's) from the l_coords structure.
*/ zx = l_coords->dx;
zy = l_coords->dy;

rho = sqrt( (zx*zx) + ((rho_0-zy)*(rho_0-zy)) );

/*
** Compute the latitude in radians.
*/ phi = ((2*atan( pow( (rf/rho) , (1/n) ))) - M_PI_2);

theta = atan2( zx,(rho_0 - zy) );

/*
** Compute the longitude in radians.
*/ lamda = ((theta/n) + lamda_0);

/*
```

- 40 -

```
** Convert the latitude/longitude from radians to degrees.
*/ phi_deg=phi/deg2radians;
lamda_deg=lamda/deg2radians;

/*
** Assign the latitude and longitude (in degrees) to the l_coords structure.
*/ l_coords->phi_value = phi_deg;
l_coords->lamda_value = lamda_deg;

/*
** Return a zero value.
*/ return(0);
}
/*
** Function to write contents of huge arrays to a file.
*/
/**************************************************************/
long huge_fwrite( void __huge *buffer, long length,
     size_t count, int fhw)
/*
** Description:  Function to write contents of huge arrays to a file.
*/
{ char __huge *pnt_buffer;
long remain;
size_t amount;
size_t nwrite;
long total;
unsigned int dos_status;

pnt_buffer = buffer;
remain=length;
total=0;

while(remain>0)
{
    if(remain>MAXWRITE)
    {
        amount=MAXWRITE;
        remain -= (long)amount;

dos_status = _dos_write(fhw,pnt_buffer,amount,&nwrite);
        if(dos_status)
        {
            (void)printf("dos_write bad status\n");
            return(0);
        } pnt_buffer += amount;

total += nwrite;

if(nwrite == 0)
        {
            return(total);
        }
    }
    else
    {
        amount=(size_t)remain;
```

- 41 -

```
        remain=0;

dos_status = _dos_write(fhw,pnt_buffer,amount,&nwrite);
        if(dos_status)
        {
            (void)printf("dos_write bad status\n");
            return(0);
        } pnt_buffer += amount;
        total += (long)nwrite;

if(nwrite == 0)
        {
            return(total);
        }
    }
}
return(total);
}
```

FIGS. 9A, 9B, 9C, 9D and 9E together show a structure diagram or flowchart depicting a program capable of building mosaics of radar data. The program of FIGS. 9A–9E is designed to run in real time by using the lookup tables built by the offline program of FIGS. 8A–8E.

Figure 9A:
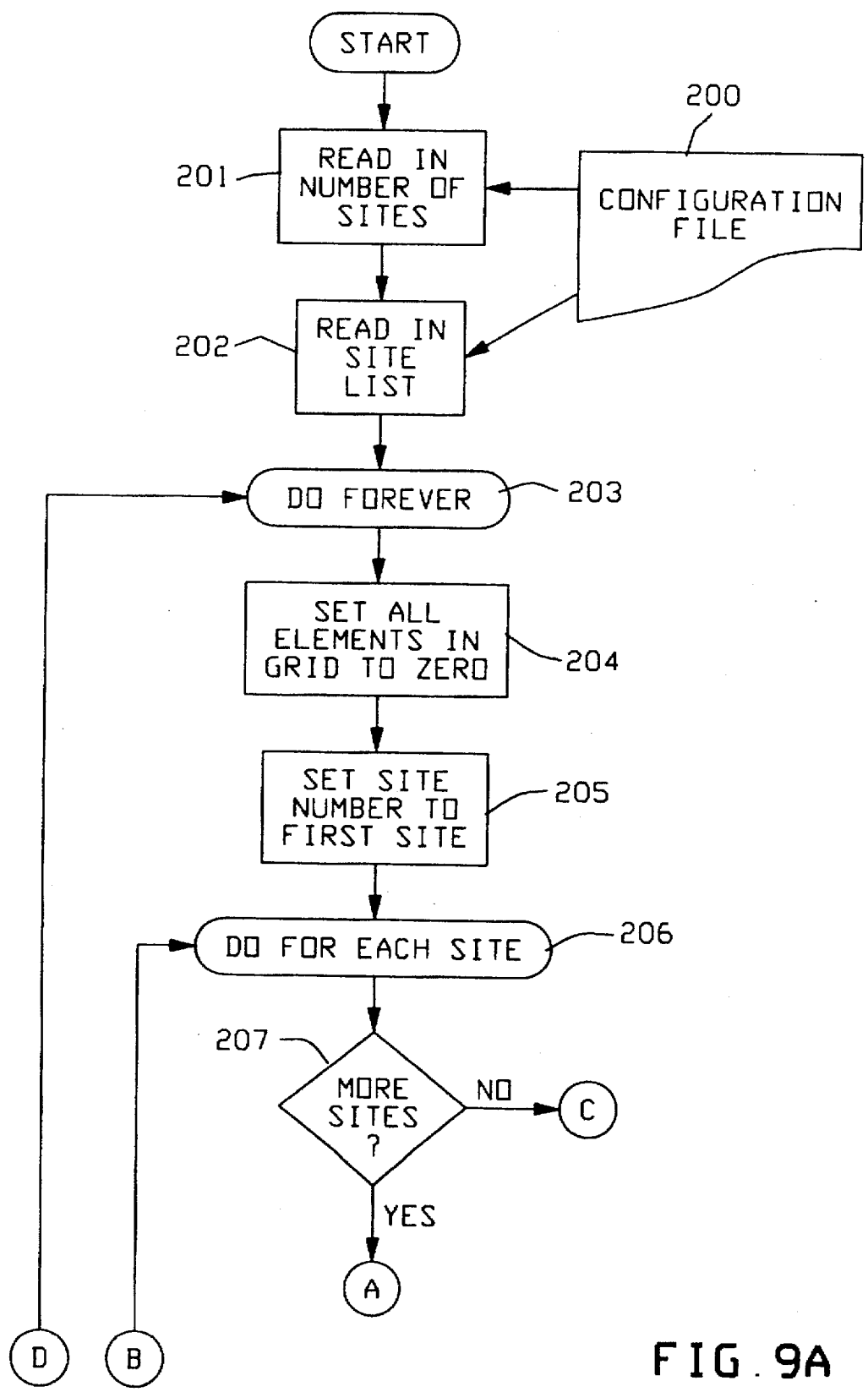
FIGS. 9A, 9B, 9C, 9D and 9E together show a flowchart for one method of building a mosaic of radar data according to the present invention using the lookup tables of FIGS. 4, 5 and 8A through 8E.

The program of FIGS. 9A–9E, when started, runs as a continuous process. As shown in FIG. 9A, a manually created configuration file 200 containing a list of sites to be used in the mosaic is used to initialize the process at steps 201 and 202. First, the process reads in, from the configuration file 200, the number of sites (step 201) and the site list (step 202) that is then stored in memory for later use. Next, a loop is entered (step 203) that runs continually (shown in FIG. 9B as a so-called "DO FOREVER" loop). Each execution of the loop results in the creation of a new mosaic that is a compilation of the most current data from the individual sites specified in the site list. In preparation for the creation of the mosaic, all elements of the two-dimensional grid within the computer's memory are set (step 204) to the same predetermined value such as zero (i.e., the grid is cleared of any existing data). Next, an index "to the current site in the site list" is set (step 205) to point to the first site on the list. Then, another loop is entered that processes (step 206) the radar sites on the site list one at a time until all of the sites have been handled (step 207).

Figure 9B:
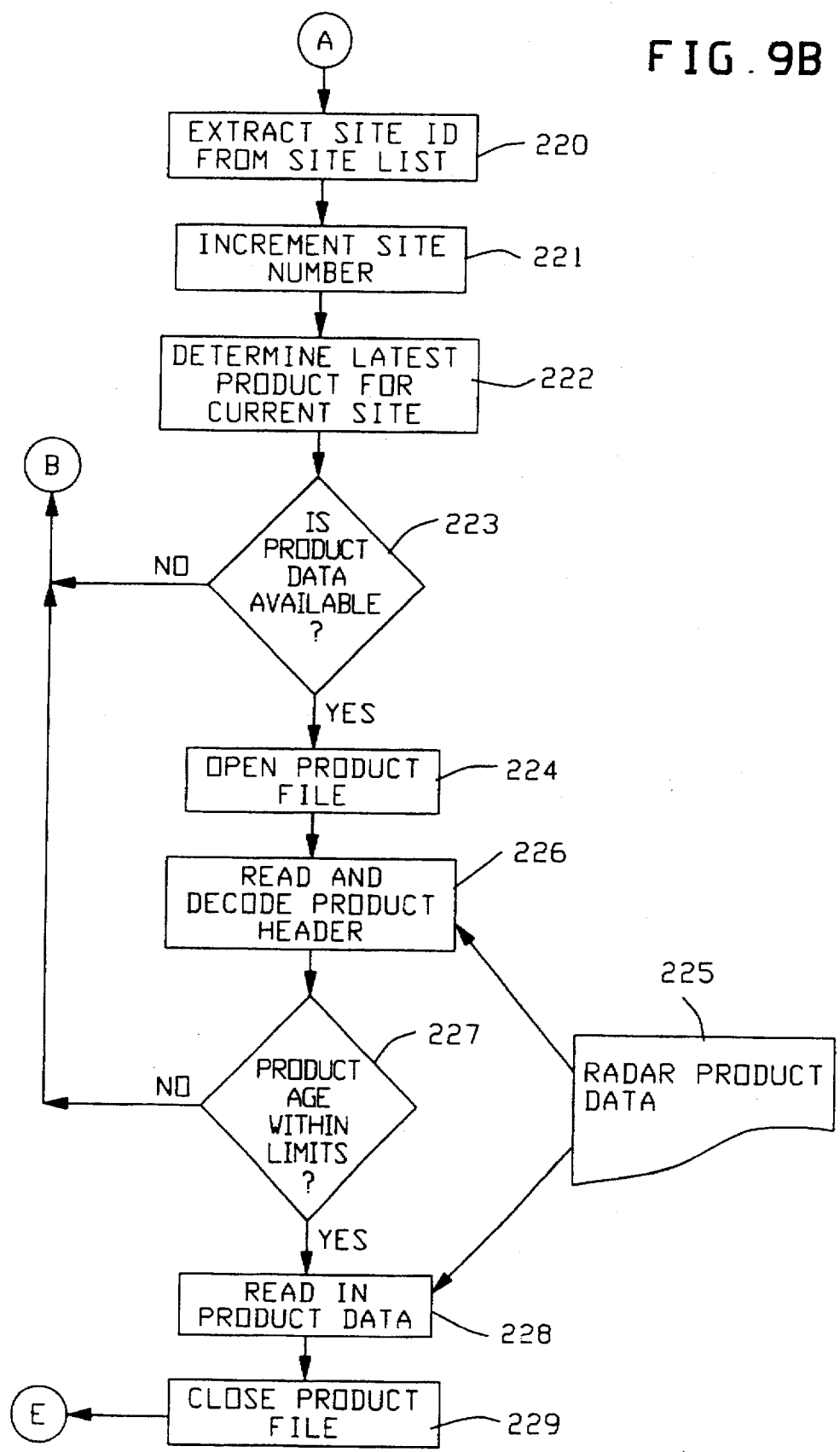

The processing of each radar site begins, as shown by FIG. 9B, by extracting the site ID number from the site list (step 220) and then incrementing the site index by one (step 221). The site ID number is used by the program to locate (step 222) data for the current site within the computer's local database 46. If no data exists for the current site (step 223) then the program skips to the next site. Otherwise, the program identifies the most current data for the site. This data (called a product) resides in a file (radar product data 225) in the local database 46. First, the file is opened (step 224) and the product "header" is read (step 226) into the program's memory. The header contains information such as data date and time and product data length. If, by examining the product date and time, the data is determined to be too old (step 227), then the program skips that site and goes on to the next site. Otherwise, using the data length, the remainder of the file 225 is read (step 228) into the computer's memory, after which the product file 225 is closed (step 229).

Figure 9C:
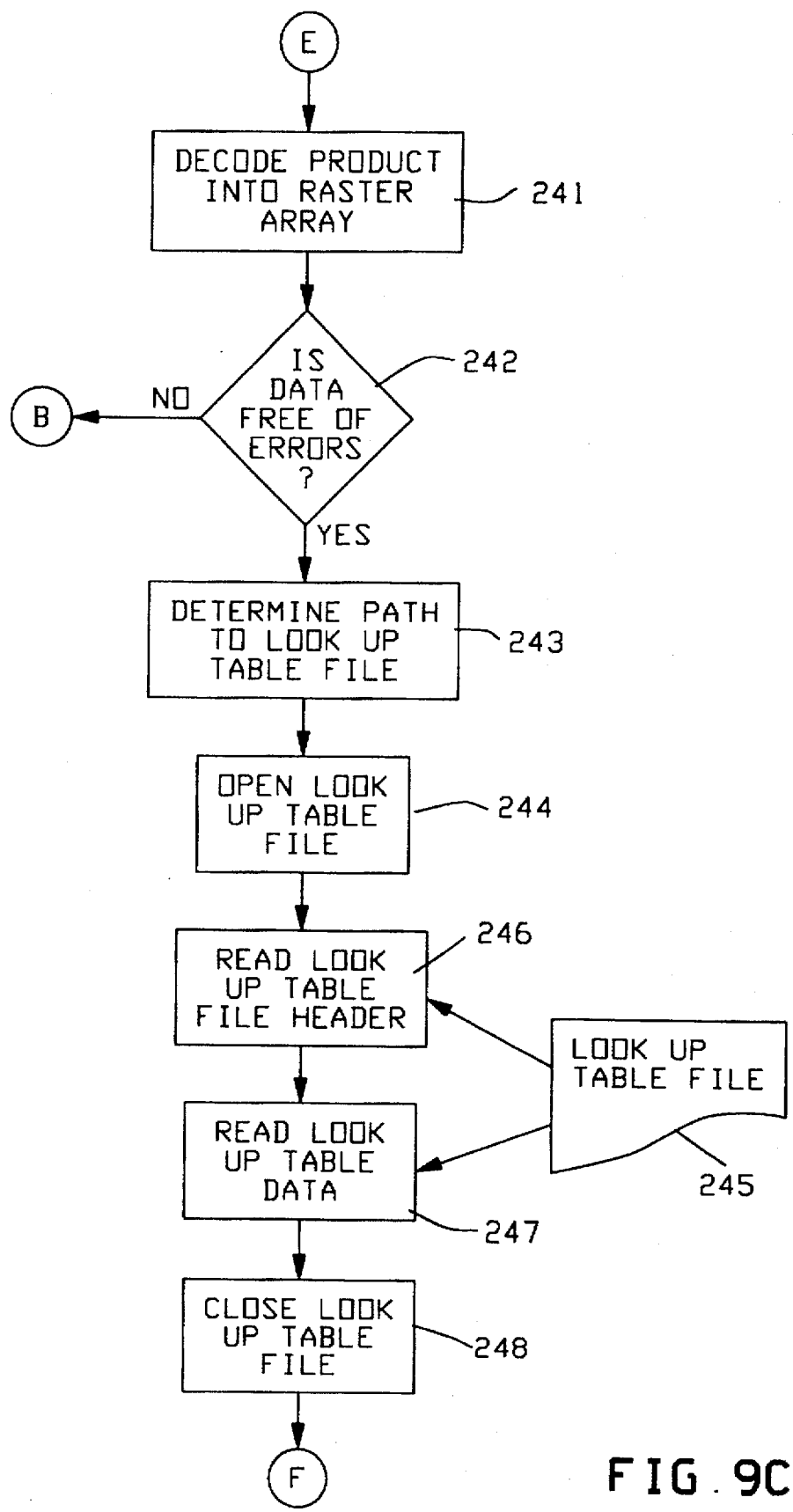

Next, as shown by FIG. 9C, the product data is decoded and stored (step 241) in a two-dimensional "raster" array. If any errors are detected during the decoding process, then the program skips to the next site (step 242). When the product is successfully decoded, the program uses the current radar site ID number to determine the location of the appropriate look-up table file in the computer's local database 46 (step 243). First, the lookup table file 245 is opened (step 244) and the header (containing the number of table entries) is read (step 246) into the program's memory. The program then uses the number of table entries to read in (step 247) the complete look-up table from file 245, which table is then stored in the program's memory. The look-up table file 245 is subsequently closed (step 248).

Figure 9D:
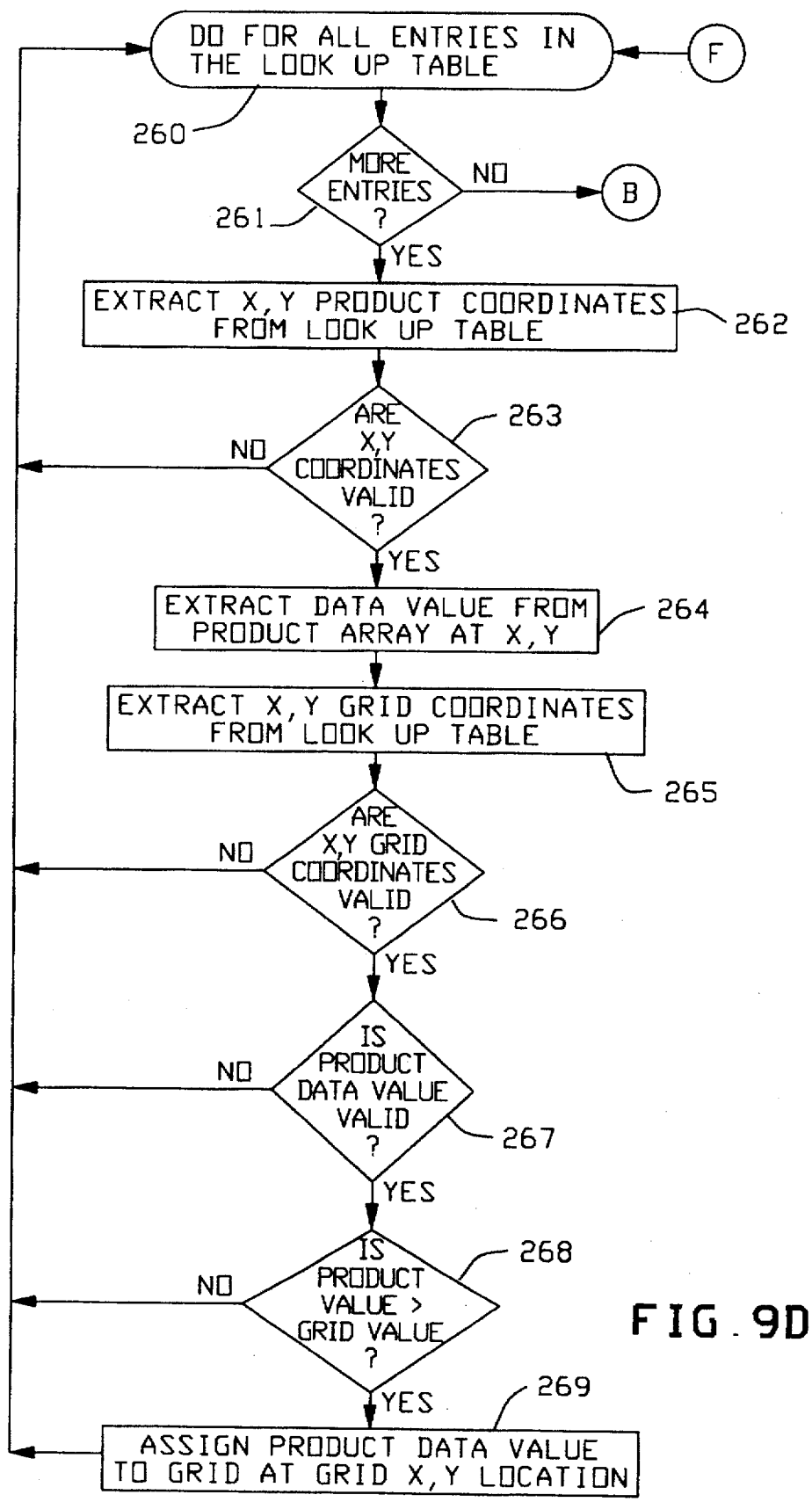

FIG. 9D shows how, once the look-up table is read in, the single site radar data (which resides in the product raster array) is assigned to the two-dimensional grid. A loop is entered to process all of the entries in the look-up table (step 260). When all processing is complete, the program goes on to the next site (step 261). First, the x and y indices into the two-dimensional product raster array are extracted from the look-up table (step 262) and checked for validity (step 263). (An invalid entry should never occur in practice, but if it should occur the program skips that entry and goes to the next entry.) The product data value is then extracted (step 264) from the product data array. Then, the x and y indices into the two-dimensional mosaic grid are extracted from the look-up table (step 265). Those coordinates are also checked for validity (step 266). (Again, an invalid entry should never occur in practice, but if one should be detected then the program skips to the next entry.) Next, the product data value is checked for validity (step 267) and any invalid data values cause the program to skip to the next look-up table entry. Then, the product value is compared (step 268) with the existing grid value and, if greater, is assigned (step 269) to the grid at the x,y location, and, if not greater, is skipped. Processing continues in that way for all remaining entries in that look-up table.

Figure 9E:
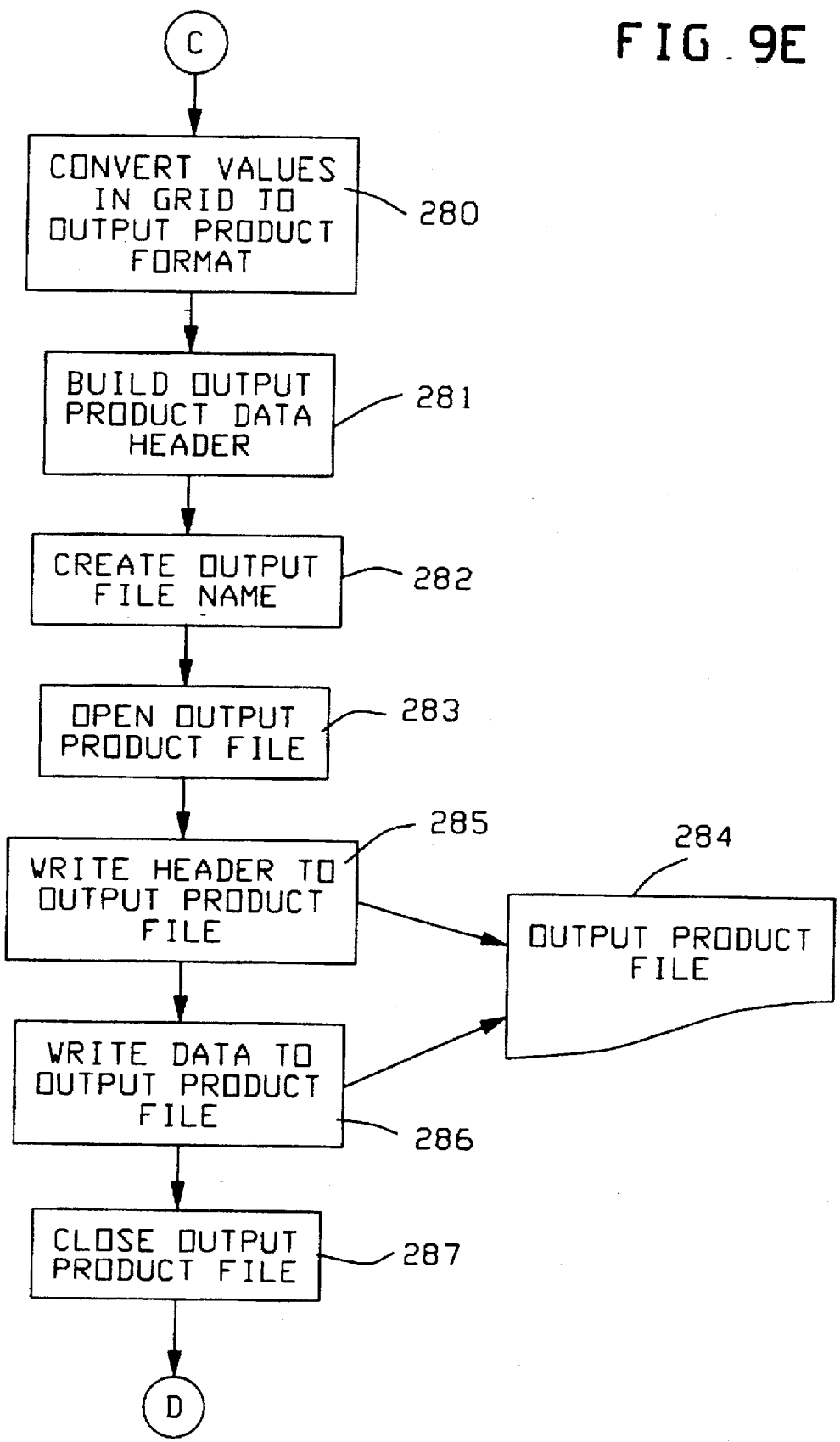

After all available sites have been so processed, the data in the grid is converted to a new product as shown by FIG. 9E. First, the values in the grid are converted (step 280) to the output product format and assigned to a buffer in the computer's memory. Then, a header is built (step 281), also in the computer's memory, containing the current date and time as well as the product data length. A unique output filename is created (step 282) and a file of that name is opened for output (step 283). Next, the data is actually written to the output product file 284. First, the product header is written (step 285) followed by the product data itself (step 286). Finally, the output product file 284 is closed (step 287) and the program goes on to start the next mosaic.

Direct mapping of individual radar data values to a mosaic grid, using one or more prebuilt lookup tables constructed with the software given above, can be implemented in software. An example of such software, written in the ANSI version of the C language usable on a Sun Microsystems workstation is given in the following pages. However, other programming languages can be used for this purpose. FIGS. 9A–9E together generally show a flowchart for this software. The software appearing in the following pages implements steps 48 and 50 of FIG. 4. The software shown above, and the software shown below, together implement steps 34, 36, 38 and 40 of FIG. 3.

```
/***************************************************
** UNISYS WIS MOSAIC PROCESSING SYSTEM
** Copyrigth 1994 Unisys Corporation
**    Copyright
** PROGRAM NAME:  BUILD.EXE
**
** DESCRIPTION:   Read in individual radar products and corresponding
**                Look Up Tables and map the product data to a grid.
**                Then take the resulting grid values and produce a
**                new product.
**
** ASSUMPTIONS:   Products for the desired sites reside in the specified
**                directories.  Look Up tables for the desired sites exist
**                in the "lut" directory.
**
****************************************************/ include <math.h>
include <errno.h>
#include <time.h>
#include <stdio.h>
#include <stdlib.h>
#include <string.h>
#include <ctype.h>

/*
** Prototype of subroutine.
*/ int get_latest(short , short , char *);

define BIN_X_IDX 0
define BIN_Y_IDX 1
#define GRID_X_IDX 2
#define GRID_Y_IDX 3
define LUT_WIDTH 4 define MAX_DATA_SIZE 300000
```

- 45 -

```
define NUM_DATA_LEVELS 16 define NODATA 0
define MIN_NUM 0
#define MIN_VALUE 0
#define NO_VALUE 0
#define MIN_X 0
define MIN_Y 0 define GRID_X_SIZE 1280
define GRID_Y_SIZE 896 define LUT_MAX 50000
define PR_BINS 232
define PR_ROWS 232 long lut_key = {123456};
typedef struct{
    long keyword;
    long num_entries;
    short header_size;
    short site_id;
    short version;
    short date_built;
    unsigned long time_built;
    short grid_res;
    short grid_width;
    short grid_height;
    short bin_res;
    short bin_width;
    short bin_height;
    short projection;
    double grid_center_phi;
    double grid_center_lamda;
    double radar_phi;
    double radar_lamda;
} lut_header_format;

lut_header_format lut_header;

typedef struct{
    double dx;
    double dy;
    double phi_org;
    double lamda_org;
    double phi_value;
    double lamda_value;
    short x;
    short y;
    short pr_id;
    short grid_id;
} coords;

long site_key = {24680};
short nexrad_site = {1};
short rrwds_site = {2};
short yes = {1};
short no = {0};

typedef struct{
   long keyword;
    short num_sites;
} site_header_format;

site_header_format site_file_header;

typedef struct{
```

- 46 -

```
    short site_id;
    short site_flag;
    short site_build_lut;
    short site_use;
    double site_lat;
    double site_lon;
}site_contents_format;

define MAX_SITES 200 site_contents_format site_file_contents[MAX_SITES];

FILE * fpw;
FILE * fpr;
FILE * fpr_prod;

char * buf;
long data_size;
long nwrite;
long nread;

static int errno = 0;

typedef struct{
    short site_id;
    char *site_text;
}site_path_format;

#define NUM_SITE_PATH 30

/*
** Example site path information.
*/ static site_path_format site_path[NUM_SITE_PATH] =
{
354,"AL_maxwell_AFB/",
395,"AR_littlerock/",
524,"AZ_phoenix/",
347,"CO_denver/",
351,"DE_dover/",
302,"FL_melbourne/",
728,"FL_miami/",
337,"IL_chicago/",
381,"IN_indianapolis/",
350,"KS_dodgecity/",
366,"KS_goodland/",
554,"KS_topeka/",
562,"KS_wichita/",
349,"MI_detroit/",
308,"MO_stlouis/",
342,"MS_columbus/",
382,"MS_jackson/",
367,"NE_hastings/",
372,"NY_griffis_AFB/",
340,"OH_cleveland/",
305,"OK_frederick/",
301,"OK_norman/",
557,"OK_tulsa/",
525,"PA_pittsburgh/",
313,"TX_amarillo/",
332,"TX_central/",
353,"TX_dyess_AFB/",
378,"TX_houston/",
303,"VA_sterling/",
000,"UNDEFINED/",
};
```

- 47 -

```c
typedef struct{
    short prod_id;
    char *prod_text;
}prod_path_format;

define NUM_PROD_PATH 1 static prod_path_format prod_path[NUM_PROD_PATH] =
{
38,"COMP_REF/",
};

/*
** Main routine to build mosaic.
*/ main()
{
#define initial_x 0
#define initial_y 0
int status;
unsigned short *index;
unsigned short *st_index;
unsigned char byte;
short n_bytes;
short run,col;
char *cp;
unsigned short length1,length2;
short k,m;
short p;
short bin;
unsigned int time1, time2;
time_t tot_sec;
unsigned short opcode;
short msg_code;
short input_source_id;
short output_source_id;
short op_mode;
short vcp;
short nrows;
long lut_size;
long age_minutes;
static long max_age_minutes = {15};
long age_seconds;
short   grid_x;
short   grid_y;
short num_sites;
short site_id;
short prod_id;
short j;
short header_size = {136};
short product[PR_BINS][PR_ROWS];
unsigned short grid[GRID_X_SIZE][GRID_Y_SIZE];
short row;
short box_x,box_y;
short row_index;
short bin_index;
short max_col;
short number_rows;
short number_bins;
short start_bin;
short start_row;
char lut_name[512];
char prod_name[512];
char prod_file[25];
char *s;
short lut[LUT_MAX][LUT_WIDTH];
```

- 48 -

```c
long entry;
long num_entry;
short prev_col;
short nbytes;
long layer_length;
long layer2_length;
long block_length;
long message_length;
long total_length;
short scale_x, scale_y;
unsigned short *nbytes_index;

unsigned short *msw_layer_len_index;
unsigned short *lsw_layer_len_index;

unsigned short *msw_layer2_len_index;
unsigned short *lsw_layer2_len_index;

unsigned short *msw_block_len_index;
unsigned short *lsw_block_len_index;
unsigned short *msw_msg_len_index;
unsigned short *lsw_msg_len_index;

unsigned short msw_layer_len;
unsigned short lsw_layer_len;

unsigned short msw_layer2_len;
unsigned short lsw_layer2_len;

unsigned short msw_block_len;
unsigned short lsw_block_len;
unsigned short msw_msg_len;
unsigned short lsw_msg_len;
short ref;
short dl;

/*
** Data level codes to assign to output product header.
*/ static unsigned short data_level_16[NUM_DATA_LEVELS] =
        {0x8002,0x0005,0x000a,
         0x000f,0x0014,0x0019,0x001e,0x0023,0x0028,0x002d,
         0x0032,0x0037,0x003c, 0x0041,0x0046,0x004b };

short pr_type;

unsigned short product_color;
unsigned short grid_color;

short flag_off = {0};
short flag_on = {1};

short num;

short prid;
short destination_id;
short num_blocks;
short divider;
long latitude_origin;
long longitude_origin;
double phi_center_deg = {38.0};
double lamda_center_deg = {-98.0};
double lat_origin_deg;
double lon_origin_deg;
unsigned short msw_latitude;
unsigned short lsw_latitude;
```

```
unsigned short msw_longitude;
unsigned short lsw_longitude;
short height_value;
short sequence_num;
short scan_num;
short elevation_num;
short sym_block_id;
short num_layers;
unsigned short raster_opcode;
unsigned short raster_const1;
unsigned short raster_const2;
unsigned short raster_const3;

char *out_str_home = "/home/";
char *out_str_site = "NATIONAL/";

short num_included;
short num_excluded;
short n;
short tab_included[MAX_SITES];
short tab_excluded[MAX_SITES];

short year,month,day;
long time_sec;
long seconds;
long cur_seconds;
short hour,minute;
short hh,mm;
long ss;

struct tm Jan_01_1970_struct = {0}; /* Initialize all fields to 0. */ time_t Jan_01_1970_t;
time_t gmt_t;

time_t total_time;
struct tm gmt_struct;

short j_date;
short cur_j_date;
short msg_date;
long msg_time;
unsigned short msw_msg_time;
unsigned short lsw_msg_time;

short scan_date;
long scan_time;
unsigned short msw_scan_time;
unsigned short lsw_scan_time;

short generation_date;
long generation_time;
unsigned short msw_generation_time;
unsigned short lsw_generation_time;

union{
      long l_value;
      short s_value[2];
} long2short;

/*
** Obtain a buffer into which existing products are read
** and new products are built and then stored from.
*/ buf=(char *)malloc(MAX_DATA_SIZE);
if( buf==NULL)
```

```
{
    (void)printf("error: malloc failed for buf, errno=%d\n",errno);
    return(1);
}

/*
** Open the configuration file and read in the header.
*/ fpr=fopen("config.dat","rb");
if(fpr==NULL)
{
    (void)printf("fopen error for configuration file header, errno=%d\n",errno);
    return(1);
} nread=fread(&site_file_header,sizeof(site_file_header),1,fpr);
if(nread==NODATA)
{
    (void)printf("fread error with site file header, errno=%d\n",errno);
    return(1);
}

/*
** Check the configuration file header for the correct keyword
** and exit the program if the keyword does not agree.
*/ if( site_file_header.keyword != site_key )
{
    (void)printf("Invalid configuration file keyword\n");
    return(1);
}

/*
** Obtain the number of sites from the configuration file header and
** use that number to determine the size of the configuration file
** contents.  Read the configuration contents from the configuration
** file.  That provides a list of sites and indicates which are NEXRAD
** and which are active (to be used in the mosaic).
*/ num_sites = site_file_header.num_sites;

nread=fread(site_file_contents,num_sites*sizeof(site_contents_format),1,fpr);
if(nread==NODATA)
{
    (void)printf("error reading configuration file contents, errno=%d\n",errno);
    return(1);
}
status = fclose(fpr);
if( status != 0 )
{
    (void)printf("error closing configuration file, errno=%d\n",errno);
} while(1) /* DO FOREVER */
{
    /*
    ** Obtain the current time in seconds since 1/1/1970 which
    ** is used to determine the age of existing products
    ** as they are read in from the database.
    */

Jan_01_1970_struct.tm_year = 70;
    Jan_01_1970_struct.tm_mon = 0;
    Jan_01_1970_struct.tm_mday = 0;
```

- 51 -

```
Jan_01_1970_t = mktime(&Jan_01_1970_struct);

if (Jan_01_1970_t == (time_t)-1)
{
    (void)printf("error: mktime(1/1/70) error.\n");
    return(1);
} total_time=time(NULL);
gmt_struct = *gmtime(&total_time);
year = gmt_struct.tm_year;
if(year>99)
{
    year-=100;
}
month = gmt_struct.tm_mon + 1;
day = gmt_struct.tm_mday;
hour = gmt_struct.tm_hour;
minute = gmt_struct.tm_min;

(void)printf("Current (gmt) year=%d month=%d day=%d hour=%d min=%d\n",
            year,month,day,hour,minute);

gmt_t = mktime(&gmt_struct);
if (gmt_t == (time_t)-1)
{
    (void)printf("error: mktime(gmt) error.\n");
    return(1);
}
else
{
    time_sec = difftime( gmt_t, Jan_01_1970_t );

cur_j_date = time_sec/86400;
    cur_seconds = time_sec%86400;
}

/*
** Initialize the counters to track sites included in and excluded from the mosaic.
*/ num_included = 0;
num_excluded = 0;

/*
** Clear the grid in which the mosaic is to be built.
*/ for( grid_y=MIN_Y; grid_y<GRID_Y_SIZE; grid_y++ )
{
    for( grid_x=MIN_X; grid_x<GRID_X_SIZE; grid_x++ )
    {
        grid[grid_x][grid_y] = NO_VALUE;
    }
}

/*
** The following is the main loop to read in individual NEXRAD
** products and map the data to a large grid.  Loop through
** the sites contained in the configuration structure.
*/ for (j=MIN_NUM; j<num_sites; j++)
{
    /*
    ** Extract the site id to request from the configuration file
```

- 52 -

```c
** data.
*/ site_id = site_file_contents[j].site_id;

/*
** Process NEXRAD data here.  Request composite reflectivity.
*/ prod_id = 38;

/*
** Find a path to the latest product of the specified type
** for the specified site with the following.  A nonzero
** status code indicates that no product is available
** so jump to the next.
*/ status = get_latest( site_id,prod_id,prod_name);
prod_name[strlen(prod_name)-1]='\0';
if(status)
{
    (void)printf("    product is unavailable.\n");
    num_excluded++;
    tab_excluded[num_excluded-1] = site_id;
    goto jump_here;
}

/*
** Open the product file using the path to the latest.
*/ fpr_prod=fopen(prod_name,"rb");
if( fpr_prod==NULL )
{
    (void)printf("    Unable to open product. site=%d\n",site_id);
    num_excluded++;
    tab_excluded[num_excluded-1] = site_id;
    printf("    path=%s\n",prod_name);
    goto jump_here;
}

/*
** Read in the product header.
*/ nread=fread(buf,header_size,1,fpr_prod);
if( nread==NODATA )
{
    (void)printf("product read error, errno=%d\n",errno);
    num_excluded++;
    tab_excluded[num_excluded-1] = site_id;
    printf("    path=%s\n",prod_name);
    goto jump_here;
}

/*
** Extract data from the product header.  First position the start
** index variable at the beginning of the buffer.
*/ st_index=(unsigned short *)buf;

index=st_index;
msg_code=*index;

/*
```

- 53 -

```
**  Extract the operational mode and volume coverage pattern from
**  the product header.  Use this information to check if the radar
**  was in a valid mode.  If the radar is in maintenance mode
**  then skip the product and jump (goto) to the end of the loop.
*/ index=st_index+16;
op_mode=*index;

index=st_index+17;
vcp=*index;

if ((op_mode!=1)&&(op_mode!=2))
{
    (void)printf("     invalid op_mode=%d vcp=%d\n",
                op_mode,vcp);
    num_excluded++;
    tab_excluded[num_excluded-1] = site_id;
    printf("       path=%s\n",prod_name);
    goto jump_here;
}

/*
**  Extract the input product site id number.  Compare with the requested
**  site id number.  If the extracted and requested site id's do not
**  match report an error and jump (goto) the next site's product.
*/ index=st_index+6;
input_source_id=*index;

if (site_file_contents[j].site_id != input_source_id)
{
    (void)printf("     requested:(%d) product:(%d) site mismatch\n",
                site_id,input_source_id);
    num_excluded++;
    tab_excluded[num_excluded-1] = site_id;
    printf("       path=%s\n",prod_name);
    goto jump_here;
}

/*
**  Extract the date (in days since 1/1/70) and the time (seconds)
**  from the product header.  Use this to determine the total time
**  in seconds since Jan 1, 1970.  This is used in a comparison with the
**  current time to determine the "age" of the product.
*/ index=st_index+20;
j_date=*index;

index=st_index+21;
time1=*index;

index=st_index+22;
time2=*index;

tot_sec=(j_date*86400)+(time1*65536)+time2;

if(tot_sec>time_sec)
{
    age_minutes = 0;
}
else
{
    age_seconds = time_sec - tot_sec;
    age_minutes = age_seconds/60;
```

- 54 -

```c
}
/*
** Check the age of the product.  If the product is too old then
** jump to the next site.
*/ if (age_minutes > max_age_minutes)
{
    (void)printf("    product is too old: age_minutes=%d\n",
                        age_minutes);
    num_excluded++;
    tab_excluded[num_excluded-1] = site_id;
    printf("      path=%s\n",prod_name);
    goto jump_here;
}

/*
** Determine the length of the data layer (in bytes).
*/ index=st_index+66;
length1=*index;

index=st_index+67;
length2=*index;

data_size=( long )( (length1*65536) + length2 );

if( data_size > MAX_DATA_SIZE )
{
    (void)printf("product data size too large to read");
    num_excluded++;
    tab_excluded[num_excluded-1] = site_id;
    printf("      path=%s\n",prod_name);
    goto jump_here;
}

/*
** Read in the rest of the product with the following.
*/ nread=fread(buf,data_size,1,fpr_prod);
if( nread==NODATA )
{
    (void)printf("error reading product file, errno=%d\n",errno);
    num_excluded++;
    tab_excluded[num_excluded-1] = site_id;
    printf("      path=%s\n",prod_name);
    goto jump_here;
} status = fclose(fpr_prod);
if( status != 0 )
{
    (void)printf("error closing input product file, errno=%d\n",errno);
    return(1);
}

/*
** Locate the position of the run length encoded raster data
** and extract the opcode and check it for validity.
*/ st_index=(unsigned short *)buf;
index=st_index;
```

- 55 -

```
opcode=*index;

if(opcode!=0xba07)
{
    (void)printf("error: invalid raster opcode in input product=%x \n",opcode);
    num_excluded++;
    tab_excluded[num_excluded-1] = site_id;
    printf("         path=%s\n",prod_name);
    goto jump_here;
}

/*
** Extract the number of rows from the product data layer.
*/ index+=9;
nrows=*index;

/*
** Point to the first row of run length encoded raster data.
*/ index+=2;

/*
** Check for a valid number of rows.
*/ if((nrows>MIN_Y)&&(nrows<=PR_ROWS))
{
    /*
    ** Loop through the rows of raster data.
    */ for(row=MIN_Y;row<nrows;row++)
    {
        n_bytes=*index;
        index++;
        cp=( char *)index;
        bin = NO_VALUE;

/*
        ** Loop through the bytes of RLE data in the current row.
        */ for(m=1;m<=n_bytes;m++)
        {
            /*
            ** Extract the current byte and determine the run and color.
            */ byte=*( cp );
            cp++;
            run=(( short )byte) / 16;
            col=(( short )byte) % 16;

if(run>0)
            {
                for(k=MIN_Y;k<run;k++)
                {
                    if((bin<PR_BINS)&&(row<PR_ROWS))
                    {
                        product[bin][row]=col;
                    }
                    else
                    {
                        /*
```

- 56 -

```
                    ** In the unlikely event that the bin or row number
                    ** exceeds the array limit then report an error and
                    ** jump to the next site's product.
                    */
                            (void)printf("error: bin=%d row=%d\n",bin,row);
                            num_excluded++;
                            tab_excluded[num_excluded-1] = site_id;
                            printf("       path=%s\n",prod_name);
                            goto jump_here;
                        }
                        bin++;
                    }
                }
            }
            index=(unsigned short *)cp;
        }
    }
    else
    {
        (void)printf("error: product invalid number of rows=%d",nrows);
        num_excluded++;
        tab_excluded[num_excluded-1] =site_id;
        printf("       path=%s\n",prod_name);
        goto jump_here;
    }

/*
    ** Next, open and read in the look up table file.  First, create
    ** a string containing the look up table (lut) file name (which is
    ** is based on the site number) and open the lut file for "read binary".
    */

(void)sprintf(lut_name,"lut/cr4_%3.3d.lut\0",site_file_contents[j].site_id);

fpr=fopen(lut_name,"rb");
    if(fpr==NULL)
    {
        (void)printf("error: error opening lut file (%s) for read, errno=%d\n",
                     lut_name,errno);
        num_excluded++;
        tab_excluded[num_excluded-1] =site_id;

goto jump_here;
    }

/*
    ** Next, read in the look up table (lut) file header from which the
    ** number of entries is extracted which is used to compute the
    ** size of the lut file contents (lut_size).  Also, check the
    ** keyword and the header size to verify that a valid "lut"
    ** header was read in.
    */ nread = fread(&lut_header,sizeof(lut_header_format),1,fpr);
    if( nread==0 )
    {
        (void)printf("error reading lut file, errno=%d\n",errno);
        num_excluded++;
        tab_excluded[num_excluded-1] = site_id;
        printf("       path=%s\n",prod_name);
        goto jump_here;
    } num_entry = lut_header.num_entries;
    if(num_entry > LUT_MAX)
    {
```

- 57 -

```
    num_entry = LUT_MAX;
} if( lut_header.keyword != lut_key )
{
    (void)printf("invalid lut keyword = %d\n",lut_header.keyword);
    num_entry = 0;
}
if( lut_header.header_size != sizeof(lut_header_format) )
{
    (void)printf("invalid lut header size = %d\n",lut_header.header_size);
    num_entry = 0;
} lut_size = num_entry*LUT_WIDTH*sizeof(short);

/*
** Do the read to read in the lut itself.
*/ nread = fread(lut,lut_size,1,fpr);

/*
** Now that the lut has been read in, close the file descriptor.
*/ status = fclose(fpr);
if( status != 0 )
{
    (void)printf("error: error closing look up table file, errno=%d\n",errno);
    return(1);
}

/*
** Loop through all of the entries in the look up table
** and map radar data bins to grid boxes.
*/ for(entry=MIN_NUM; entry<num_entry; entry++)
{
    /*
    ** Extract the current radar product's bin and row coordinate.
    */ bin = lut[entry][BIN_X_IDX];
    row = lut[entry][BIN_Y_IDX];

/*
    ** Check that the bin and row are valid indicies in the
    ** product data array (that is, they are valid).
    */ if((bin>=MIN_X)&&(bin<PR_BINS)&&(row>=MIN_Y)&&(row<PR_ROWS))
    {
        /*
        ** Extract the product color (data level) value from the
        ** product array for the current bin and row.
        */ product_color = product[bin][row];

/*
        ** Extract the corresponding x and y grid coordinates.
        */ grid_x = lut[entry][GRID_X_IDX];
        grid_y = lut[entry][GRID_Y_IDX];
```

- 58 -

```
     /*
     ** Check the current x and y grid coordinates to verify that
     ** the values are valid array indicies.
     */ if((grid_x>=MIN_X)&&(grid_x<GRID_X_SIZE)&&
                (grid_y>=MIN_Y)&&(grid_y<GRID_Y_SIZE))
     {
          /*
          ** Examine the existing grid box for a value.
          */ if( grid[grid_x][grid_y] == NO_VALUE )
          {
               grid[grid_x][grid_y] = product_color;
          }
          else
          {
               /*
               ** In the case with an existing value in the grid the
               ** a comparison is needed between the existing grid
               ** value and the current product color value.
               ** Map the product color when it is greater than the
               ** existing grid color value.
               */ grid_color = grid[grid_x][grid_y];

if(product_color > grid_color)
               {
                    grid[grid_x][grid_y] = product_color;
               }
          }
     }
     else
     {
          /*
          ** This handles the unlikely case that an x,y grid coordinate
          ** was not a valid array index.  For now, print the value
          ** and go to the next lut table entry.
          */

(void)printf("entry=%d grid_x=%d grid_y=%d\n",entry,grid_x,grid_y);
     }
 }
 else
 {
      /*
      ** This handles the unlikely case that a product bin row and column
      ** was not a valid array index.  For now, print the value
      ** and go to the next lut table entry.
      */

(void)printf("entry=%d bin=%d row=%d\n",entry,bin,row);
 }
} printf("     product integrated id=%d opmode=%d vcp=%d\n",
              msg_code,op_mode,vcp);
printf("          path=%s\n",prod_name);
num_included++;
tab_included[num_included-1] = site_id;

jump_here:;  /* Jump here to skip a product and go on to the next site. */
  }
/*
```

```
** Now that the loop to process the individual site products
** into the grid is complete, print out the sites which were included
** and the sites which were excluded.
*/

(void)printf("Sites processing complete:\n");
(void)printf("   number included=%d\n",num_included);
for(n=0; n<num_included; n++)
{
    (void)printf("     included=%d\n",tab_included[n]);
}

(void)printf("   number excluded=%d\n",num_excluded);
for(n=0; n<num_excluded; n++)
{
    (void)printf("     excluded=%d\n",tab_excluded[n]);
}

/*
** The products have been mapped to the grid.  Build a mosaic product here.
*/ prid = 5;

/*
** Position the pointer at the beginning of the buffer in
** order to be ready to assign data to the buffer.
*/ st_index=(unsigned short *)buf;

index=st_index+0;

/*
** Build a string containing the output filename.
*/

(void)strcpy(prod_name,out_str_home);
(void)strcat(prod_name,out_str_site);

/*
** Continue to build the product pathname.  The following builds
** the actual file name in year, month,day,hour,minute format.
** Concatenate the filename to complete the product pathname.
*/

(void)sprintf(prod_file,"%.2d%.2d%.2d.%.2d%.2d\0",
                year,month,day,hour,minute);
(void)strcat(prod_name,prod_file);

/*
** Open the product pathname for write binary with the
** following.
*/ fpw=fopen(prod_name,"wb");
if(fpw==NULL)
{
    (void)printf("fopen for write error, errno=%d\n",errno);
    return(1);
}

/*
** Define the parameters which specify how the product
** is to be built.
*/
```

- 60 -

```
number_rows = 896;
number_bins = 1280;
scale_x = 1;
scale_y = 1;
start_row = 0;
start_bin = 0;
output_source_id = 10000;
lat_origin_deg = phi_center_deg;
lon_origin_deg = lamda_center_deg;

/*
** Then start assigning the data to the product header.  Every field
** must get a value to overwrite any existing data in the buffer.
*/ msg_code = prid;        /* Assign the message code    */
*index = msg_code;      /*   which is the product ID. */ index=st_index+1;
msg_date = cur_j_date;    /* Assign current date in days since 1/1/70. */
*index = msg_date;

msg_time = cur_seconds;             /* Convert seconds to 2 halfwords.  */
long2short.l_value = msg_time;

index=st_index+2;
msw_msg_time = long2short.s_value[0];
*index = msw_msg_time;            /* Assign current time (msw). */ index=st_index+3;
lsw_msg_time = long2short.s_value[1];
*index = lsw_msg_time;            /* Assign current time (lsw). */ msw_msg_len_index=st_index+4; /*Save position of the    */
lsw_msg_len_index=st_index+5; /* of the message length. */ index=st_index+6;
*index = output_source_id;         /* Assign source id. */ index=st_index+7;
destination_id = NO_VALUE;
*index = destination_id; /* Assign destination id (unused). */ index=st_index+8;
num_blocks = 3;
*index = num_blocks;     /* Assign the number of blocks. */ index=st_index+9;
divider = -1;
*index=divider;          /* Assign block divider. */ latitude_origin = (long)(lat_origin_deg*1000.);
long2short.l_value = latitude_origin;

index=st_index+10;
msw_latitude = long2short.s_value[0];

*index = msw_latitude; /* Assign origin latitude (msw). */ index=st_index+11;
lsw_latitude = long2short.s_value[1];
*index = lsw_latitude; /* Assign origin latitude (lsw). */ longitude_origin = (long)(lon_origin_deg*1000.);
long2short.l_value = longitude_origin;

index=st_index+12;
```

- 61 -

```
msw_longitude = long2short.s_value[0];
*index = msw_longitude; /* Assign origin longitude (msw). */ index=st_index+13;
lsw_longitude = long2short.s_value[1];
*index = lsw_longitude; /* Assign origin longitude (lsw). */ index=st_index+14;
height_value = NO_VALUE;
*index = height_value; /* Assign the height value (unused).*/ index=st_index+15;
*index = prid;          /* Assign the product ID. */ index=st_index+16;
op_mode = 2;
*index = op_mode;       /* Assign the operational mode value. */ index=st_index+17;
vcp = NO_VALUE;
*index = vcp;     /* Assign the volume coverage pattern. */ index=st_index+18;
sequence_num = NO_VALUE;
*index = sequence_num; /* Assign the sequence number (unused). */ index=st_index+19;
scan_num = NO_VALUE;
*index = scan_num;  /* Assign the volume scan number (unused). */ index=st_index+20;
scan_date = cur_j_date;
*index = scan_date; /* Assign the scan date. */ scan_time = cur_seconds;
long2short.l_value = scan_time;

index=st_index+21;
msw_scan_time = long2short.s_value[0];
*index = msw_scan_time; /* Assign the scan time (msw). */ index=st_index+22;
lsw_scan_time = long2short.s_value[1];
*index = lsw_scan_time; /* Assign the scan time (lsw). */ index=st_index+23;
generation_date = cur_j_date;
*index = generation_date; /* Assign the generation date. */ generation_time = cur_seconds;
long2short.l_value = generation_time;

index=st_index+24;
msw_generation_time = long2short.s_value[0];
*index = msw_generation_time; /* Assign the generation */
                              /*          time (msw).*/
index=st_index+25;
lsw_generation_time = long2short.s_value[1];
*index = lsw_generation_time; /* Assign the generation */
                              /*          time (lsw).*/ index=st_index+26;
*index = NO_VALUE;         /* Product Dependent (unused). */ index=st_index+27;
*index = NO_VALUE;         /* Product Dependent (unused). */
```

- 62 -

```
index=st_index+28;
elevation_num = NO_VALUE;
*index = elevation_num;/* Assign the elevation number (unused). */ index=st_index+29;
*index = NO_VALUE;          /* Product Dependent (unused). */ index=st_index+30;          /* Save position of data levels. */

/*
** Assign the appropriate set of data levels values.
*/ for( dl=MIN_VALUE; dl<NUM_DATA_LEVELS; dl++ )
{
    *index = data_level_16[dl];
    index++;
} index=st_index+46;
*index = NO_VALUE;          /* Product Dependent (unused). */ index=st_index+47;
*index = NO_VALUE;          /* Product Dependent (unused). */ index=st_index+48;
*index = NO_VALUE;          /* Product Dependent (unused). */ index=st_index+49;
*index = NO_VALUE;          /* Product Dependent (unused). */ index=st_index+50;
*index = NO_VALUE;          /* Product Dependent (unused). */ index=st_index+51;
*index = NO_VALUE;          /* Product Dependent (unused). */ index=st_index+52;
*index = number_bins;       /* Number of columns (bins). */ index=st_index+53;
*index = NO_VALUE;          /* Unused. */ index=st_index+54;
*index = NO_VALUE;          /* Offset to symbology (msw). */ index=st_index+55;
*index = 60;                /* Offset to symbology (lsw). */ index=st_index+56;
*index = NO_VALUE;          /* Offset to graphic (msw). */ index=st_index+57;
*index = NO_VALUE;          /* Offset to graphic (lsw). */ index=st_index+58;
*index = NO_VALUE;          /* Offset to tabular (msw). */ index=st_index+59;
*index = NO_VALUE;          /* Offset to tabular (lsw). */ index=st_index+60;          /* Beginning of symbology block */
divider = -1;
*index=divider;             /* Assign block divider. */ index = st_index+61;
```

- 63 -

```
sym_block_id = 1;
*index=sym_block_id;    /* Assign symbology block ID.  */ index= st_index+62;
msw_block_len_index = index; /* Save location of block size value*/ index= st_index+63;
lsw_block_len_index = index;

index= st_index+64;
num_layers = 1;
*index = num_layers;        /* Assign number of layers */ index= st_index+65;
*index = divider;           /* Assign layer divider. */ index= st_index+66;
msw_layer_len_index = index; /* Save location of layer length. */ index= st_index+67;
lsw_layer_len_index = index;

index= st_index+68;
raster_opcode = 0xba07;
*index = raster_opcode;     /* Assign Raster data format opcode. */ index= st_index+69;
raster_const1 = 0x8000;
*index = raster_const1;     /* Assign Raster data format constant. */ index= st_index+70;
raster_const2 = 0x00c0;
*index = raster_const2;     /* Assign Raster data format constant. */ index= st_index+71;
*index = NO_VALUE;          /* Assign placeholder for raster x origin. */ index= st_index+72;
*index = NO_VALUE;          /* Assign placeholder for raster y origin. */ index= st_index+73;
*index = 1;     /* Assign scale x (integer portion). */ index= st_index+74;
*index = NO_VALUE;          /* Assign scale x (fractional portion). */ index= st_index+75;
*index = 1;     /* Assign scale y (integer portion). */ index= st_index+76;
*index = NO_VALUE;          /* Assign scale y (fractional portion). */ index= st_index+77;
*index = number_rows;   /* Assign number of rows.  */ index= st_index+78;
raster_const3 = 2;
*index = raster_const3;     /* Assign packing descriptor.  */ index++;
nbytes_index=index; /*Save position of the "number of   */
                    /* bytes this row" for the 1st row. */ layer_length = 22;

/*
** The following run length encodes the data in the grid.
```

```
** Loop through all of the rows in the grid with the following.
*/ for(row=MIN_Y;row<number_rows;row++)
{
    prev_col=-1;
    run=MIN_VALUE;
    nbytes=MIN_VALUE;
    index++;
    cp=(char *)index;

/*
    ** Loop through all of the bins in the current row.
    */ for(bin=MIN_X;bin<number_bins;bin++)
    {
        /*
        ** Extract the color value from the grid at the
        ** current bin and row location.  Mask off the upper
        ** bits so that only the 4 bit color value remains.
        */ col = grid[bin][row];

/*
        ** Now that the color has been determined, either start
        ** a new "run" or update an existing "run" with the following.
        */ if( ((prev_col!=-1)&&(col!=prev_col)) || (run==15) )
        {
            /*
            ** Start a new "run" at the beginning of a row, when
            ** the color changes, and when the current run is 15
            ** (which is the maximum run value).  The run/color
            ** combination is assigned to the buffer at the position
            ** of the character pointer (cp).
            */ byte=(run*16)+prev_col;
            *(cp)=byte;
            cp++;
            nbytes++;
            run=1;
            prev_col = col;
        }
        else
        {
            /* Otherwise, update an existing run and go on to the next
            ** grid box bin value.
            */ run++;
            prev_col = col;
        }
    }
    /*
    ** When all bins in the current row have been processed
    ** then check if a value remains to be stored.
    */ if (run>1)
    {
        /*
        ** Store the last "run color" combination in the
```

- 65 -

```
        ** output buffer with the following.
        */ byte=(run*16)+prev_col;
        *(cp)=byte;
        cp++;
        nbytes++;
    }

/*
    ** If the number of bytes is odd then pad
    ** one more byte with a value of zero.
    */ if(nbytes % 2)
    {
        byte=MIN_VALUE;
        *(cp)=byte;
        cp++;
        nbytes++;
    }

/*
    ** Assign the number of bytes for this row to the
    ** buffer in the proper location.
    */

*(nbytes_index)=nbytes;
    layer_length+=nbytes;

/*
    ** Update layer_length to include 2 bytes
    ** for the nbytes value.
    */ layer_length+=2;

/*
    ** Advance the index pointer so that it points to the
    ** location of the next row's byte length.
    */ index=(unsigned short *)cp;
    nbytes_index=index;
}

/*
** Now that all of the rows in the grid have been processed,
** convert the layer length value to 2 "halfwords"
** and assign those to the layer size position in the
** product symbology layer one header.
*/ long2short.l_value = layer_length;
msw_layer_len = long2short.s_value[0];
lsw_layer_len = long2short.s_value[1];
*msw_layer_len_index = msw_layer_len;
*lsw_layer_len_index = lsw_layer_len;

block_length = layer_length+16;

/*
** Convert the block length value to 2 "halfwords"
** and assign those to the block length position in the
** product symbology block header.
*/
```

```
        long2short.l_value = block_length;
        msw_block_len = long2short.s_value[0];
        lsw_block_len = long2short.s_value[1];
        *msw_block_len_index = msw_block_len;
        *lsw_block_len_index = lsw_block_len;

/*
        ** Convert the message length value to 2 "halfwords"
        ** and assign those to the message length position in the
        ** product message header block.
        */ total_length = block_length+18+102;
        message_length = total_length;
        long2short.l_value = message_length;
        msw_msg_len = long2short.s_value[0];
        lsw_msg_len = long2short.s_value[1];
        *msw_msg_len_index = msw_msg_len;
        *lsw_msg_len_index = lsw_msg_len;

/*
        ** Write the product to the file and close the file.
        */ nwrite = fwrite(buf,total_length,1,fpw);
        if(nwrite==NODATA)
        {
            (void)printf("error writing product file, errno=%d\n",errno);
            return(1);
        }
        status = fflush(fpw);
        if( status != 0 )
        {
            (void)printf("error: error flushing product file, errno=%d\n",errno);
            return(1);
        }
        status = fclose(fpw);
        if( status != 0 )
        {
            (void)printf("error: error closing product file, errno=%d\n",errno);
            return(1);
        } printf("Product is complete.  \n\n");
        (void)fflush(stdout);
        (void)fflush(stderr);
}
return(0);
}

/*
** Routine to obtain latest version of the requested product for the requested site.
*/
int get_latest(short site_id, short prod_id, char *s)
{

/*
** This passes a string containing the complete pathname
** to the latest product in the data base of the type specified
** by the product id and for the site specified by site id.
**
** A status code is returned by the routine.  The following lists the
** return values: return = 0 -> product name found (OK to proceed).
**                return = 1 -> no product found in directory.
**                return = 2 -> invalid product id number.
**                return = 3 -> invalid site id number.
**                return = 4 -> popen failed.
```

- 67 -

```
*/ char *test;
char command[512];
char string[512];

const char *command1 = "/usr/bin/ls -r ";
const char *command2 = "??????.???? 2>/dev/null|/usr/ucb/head -1 ";

const char *string_home = "/home/Products/radar/";

FILE *cfd;

short j;

/*
** Copy the first part of the command to the command string.
*/

(void)strcpy(command,command1);

/*
** Concatenate the main (home) directory string to the
** command string.
*/

(void)strcat(command,string_home);

/*
** Search for the specified site id with the following loop.
*/ for(j=0; j<NUM_SITE_PATH; j++)
{
    if(site_path[j].site_id == site_id )
    {
        /*
        ** When the site id is found, concatenate the site
        ** name path string to the command string and then
        ** jump (break) out of the look.
        */

(void)strcat(command,site_path[j].site_text);
        goto jump1_here;
    }
}
/*
** The following 3 statements are executed only when the site id
** is not found.  Null the path string, copy it to the output string,
** and return from the routine with a nonzero value indicating
** that the product was not found.
*/ string[0]='\0';
(void)strcpy(s,string);
return(2);

jump1_here:; /* jump to here and continue. */

/*
** The following searches the list of product id's for the
** specifed id.
*/ for(j=0; j<NUM_PROD_PATH; j++)
{
```

```
    if(prod_path[j].prod_id == prod_id )
    {
        /*
        ** When the product id is found, concatenate the product
        ** name path string to the command string and then
        ** jump (break) out of the look.
        */

(void)strcat(command,prod_path[j].prod_text);
        goto jump2_here;
    }
}

/*
** The following is executed only when the product id is
** not found.  Null the output string, copy it to the output,
** and return from the routine with a nonzero value indicating
** an invalid path.
*/ string[0]='\0';
(void)strcpy(s,string);
return(3);

jump2_here:; /* jump to here and continue. */

/*
** Concatenate the last part of the command on to the end of the
** command string.
*/

(void)strcat(command,command2);

/*
** Open a pipe and execute the command under the "sh" shell.
** The result is returned in a string pointed to by the pointer "cfd".
*/ cfd=popen(command,"r");
if(cfd==NULL)
{
    /*
    ** This handles the unlikely case that the popen function failed.
    ** Print a message and return with a nonzero status code.
    */

(void)printf("get_latest error -> cfd is NULL: errno=%d\n",errno);
    return(4);
}

/*
** Get the string with the following.  Remember that fgets returns
** a string which include a newline character at the end (which must
** be removed by replacing it with a NUL character.
*/ string[0]='\0';
(void)strcpy(s,string);
test=fgets(string,sizeof(string),cfd);
pclose(cfd);

/*
** Check the first character of the string for a null.
*/ if(string[0]=='\0')
{
```

- 69 -

```
    /*
    ** This handles a string with the first character a null.
    ** It means that the requested product was not found.
    ** The null string is passed and the routine returns with a
    ** nonzero value.
    */

(void)strcpy(s,string);
        return(1);
}
/*
** When the string is valid, replace the last character (a carriage return)
** with the null character.  This insures that just the path name is
** returned to the calling routine.
*/ string[strlen(string)-1]='\0';

/*
** Copy the string to the output string which is passed to the calling
** routine.  The value of zero is returned with return indicating
** that a valid product was found.
*/

(void)strcpy(s,string);

return(0);
}
```

The apparatus and method of the present invention converts a radar data bin (or the like) to a grid location or box in a resulting mosaic, rather than vice versa. If the reverse is done, occasional radar data bins could be missed.

The present invention can construct a mosaic using any data that is geographical or otherwise territorial (in its broadest sense) in nature or relating to merging into one mosaic points from a plurality of surfaces. However, it is strongly preferred that such data be in a raster format. Data from different sites can thereby be combined to produce a single mosaic.

The present invention can be practiced using prebuilt lookup tables, or by performing the reprojection calculations in real time. However, use of lookup tables is preferred, for faster operation and quicker response in real time.

Some of the many advantages of the invention should now be readily apparent. For example, apparatus and method are provided for combining of data from multiple sources into one or more mosaics such as would be suitable for utilization by end users. Such apparatus and method is capable of accurately and efficiently constructing such mosaics. Also, the location of any holes in such a mosaic can thereby be identified. The present invention also provides for filling such holes.

Thus there has been provided apparatus and method for combining data from a plurality of sites into a single image covering a desired geographical area. Such apparatus and method are capable of combining, in real time, radar data (such as weather radar data) or other data in digital format from multiple radar sites into a mosaic covering a geographical area. Such apparatus and method are furthermore capable of combining data from a plurality of sources into a single image that can be run on a general purpose computer such as a personal computer. Such apparatus and method are capable of producing a mosaic of weather radar data that can provide location and intensity of precipitation and other meteorological phenomena throughout a large geographical area. When lookup tables are used, the present invention can accurately combine a substantial amount of data from a plurality of desired sites fast enough to provide a current depiction of the weather or other phenomena.

Obviously, many modifications and variations of the present invention are possible in light of the above teachings. It is therefore to be understood that the foregoing embodiments are presented by way of example only and that, within the scope of the appended claims and equivalents thereto, the invention may be practiced otherwise than as specifically described.

What is claimed is:

1. A method for inserting a first set of data having a first coordinate system into a data mosaic having a second coordinate system which may be different from the first coordinate system, comprising the steps of:

converting the coordinate position of one item of the first set of data into a first distance from a first reference point in the first coordinate system;

converting the first distance to a coordinate position in a third coordinate system, wherein the coordinate position of the first reference point in the third coordinate system is known;

converting the coordinate position in the third coordinate system to a second distance from a second reference point in the second coordinate system, wherein the coordinate position of the second reference point in the third coordinate system is known; and converting the second distance to a coordinate position in the second coordinate system.

2. A method as defined in claim 1, further comprising the step of:

after said step of converting into the first distance, determining whether the first distance exceeds a preset value.

3. A method as defined in claim 1 wherein said step of converting the first distance to a coordinate position in a third coordinate system comprises converting the first distance to a latitude and longitude position.

4. A method for inserting a first set of data having a first coordinate system into a data mosaic having a second coordinate system which may be different from the first coordinate system, comprising the steps of:

forming for the first set of data a table having a plurality of entries, each such entry having a coordinate position in the first coordinate system having any of the first set of data, and each coordinate position in the second coordinate system corresponding to that coordinate position in the first coordinate system, said forming step comprising the steps of:

converting the coordinate position of one item of the first set of data into a first distance from a first reference point in the first coordinate system; converting the first distance to a coordinate position in a third coordinate system, wherein the coordinate position of the first reference point in the third coordinate system is known;

converting the coordinate position in the third coordinate system to a second distance from a second reference point in the second coordinate system, wherein the coordinate position of the second reference point in the third coordinate system is known;

converting the second distance to a coordinate position in the second coordinate system; and after said forming step, using the table, converting each of a plurality of coordinate positions in the first coordinate system having at least some of the first set of data to one or more coordinate positions in the second coordinate system.

5. A method as defined in claim 4 wherein said forming step further comprises the step of:

after said step of converting into the first distance, determining whether the first distance exceeds a preset value.

6. A method as defined in claim 4 wherein said step of converting the first distance to a coordinate position in a third coordinate system comprises converting the first distance to a latitude and longitude position.

7. A method for inserting a first set of data having a first coordinate system into a data mosaic having a second coordinate system which may be different from the first coordinate system, comprising the steps of:

converting first coordinate positions for the first set of data in the first coordinate system into second corresponding coordinate positions in the second coordinate system;

before, during or after said converting step, defining an array of data of a first value in the second coordinate system, the array including at least all of the second corresponding coordinate positions;

after said defining step, changing the value of each of a first subarray of the array of data from the first value to a second value, the first subarray consisting of all coordinate positions in the second coordinate system that could be mapped into any of the first coordinate positions in the first coordinate system;

after said above changing step, changing the value of each of the second corresponding coordinate positions in the first subarray from the second value to a third value;

after said converting step and said changing steps, for a location in the array having the second value, determining the positionally closest corresponding one of the first coordinate positions; and after said determining step, inserting the value of the positionally closest corresponding one of the first coordinate positions in a coordinate position of the second coordinate system corresponding to the coordinate position in the array having the second value.

8. A method as defined in claim 7 wherein said step of converting first coordinate positions into second corresponding coordinate positions comprises the steps of:

converting the coordinate position of one item of the first set of data into a first distance from a first reference point in the first coordinate system;

converting the first distance to a coordinate position in a third coordinate system, wherein the coordinate position of the first reference point in the third coordinate system is known;

converting the coordinate position in the third coordinate system to a second distance from a second reference point in the second coordinate system, wherein the coordinate position of the second reference point in the third coordinate system is known; and converting the second distance to a coordinate position in the second coordinate system.

9. A method as defined in claim 8 wherein said step of converting the first distance to a coordinate position in a third coordinate system comprises converting the first distance to a latitude and longitude position.

10. A method as defined in claim 7 wherein said step of converting first coordinate positions into second corresponding coordinate positions comprises the steps of:

converting the coordinate position of one item of the first set of data into a first relative coordinate position relative to a first reference point in the first coordinate system;

converting the first relative coordinate position to a coordinate position in a third coordinate system, wherein the coordinate position of the first reference point in the third coordinate system is known;

converting the coordinate position in the third coordinate system to a second relative coordinate position relative to a second reference point in the second coordinate system, wherein the coordinate position of the second reference point in the third coordinate system is known; and converting the second relative coordinate position to a coordinate position in the second coordinate system.

11. A method as defined in claim 10 wherein said step of converting the first relative coordinate position to a coordinate position in a third coordinate system comprises converting the first relative coordinate position to a latitude and longitude position.

12. A method as defined in claim 7 wherein said step of converting first coordinate positions into second corresponding coordinate positions comprises the steps of:

forming for the first set of data a table having a plurality of entries, each such entry having a coordinate position in the first coordinate system having any of the first set of data, and each coordinate position in the second coordinate system corresponding to that coordinate position in the first coordinate system, said forming step comprising the steps of:

converting the coordinate position of one item of the first set of data into a first distance from a first reference point in the first coordinate system;

converting the first distance to a coordinate position in a third coordinate system, wherein the coordinate position of the first reference point in the third coordinate system is known;

converting the coordinate position in the third coordinate system to a second distance from a second reference point in the second coordinate system, wherein the coordinate position of the second reference point in the third coordinate system is known;

converting the second distance to a coordinate position in the second coordinate system; and after said forming step, using the table, converting each of a plurality of coordinate positions in the first coordinate system having at least some of the first set of data to one or more coordinate positions in the second coordinate system.

13. A method as defined in claim 12 wherein said step of converting the first distance to a coordinate position in a third coordinate system comprises converting the first distance to a latitude and longitude position.

14. A method as defined in claim 7 wherein said step of converting first coordinate positions into second corresponding coordinate positions comprises the steps of:

forming for the first set of data a table having a plurality of entries, each such entry having a coordinate position in the first coordinate system having any of the first set of data, and each coordinate position in the second coordinate system corresponding to that coordinate position in the first coordinate system, said forming step comprising the steps of:

converting the coordinate position of one item of the first set of data into a first relative coordinate position relative to a first reference point in the first coordinate system;

converting the first relative coordinate position to a coordinate position in a third coordinate system, wherein the coordinate position of the first reference point in the third coordinate system is known;

converting the coordinate position in the third coordinate system to a second relative coordinate position relative to a second reference point in the second coordinate system, wherein the coordinate position of the second reference point in the third coordinate system is known;

converting the second relative coordinate position to a coordinate position in the second coordinate system; and after said forming step, using the table, converting each of a plurality of coordinate positions in the first coordinate system having at least some of the first set of data to one or more coordinate positions in the second coordinate system.

15. A method as defined in claim 14 wherein said step of converting the first relative coordinate position to a coordinate position in a third coordinate system comprises converting the first relative coordinate position to a latitude and longitude position.

16. Apparatus for inserting a first set of data having a first coordinate system into a data mosaic having a second coordinate system which may be different from the first coordinate system, comprising:

means for converting the coordinate position of one item of the first set of data into a first distance from a first reference point in the first coordinate system;

means for converting the first distance to a coordinate position in a third coordinate system, wherein the coordinate position of the first reference point in the third coordinate system is known;

means for converting the coordinate position in the third coordinate system to a second distance from a second reference point in the second coordinate system, wherein the coordinate position of the second reference point in the third coordinate system is known; and means for converting the second distance to a coordinate position in the second coordinate system.

17. Apparatus as defined in claim 16, further comprising:

means for determining whether the first distance exceeds a preset value.

18. Apparatus as defined in claim 16 wherein said means for converting the first distance to a coordinate position in a third coordinate system comprises means for converting the first distance to a latitude and longitude position.

19. Apparatus for inserting a first set of data having a first coordinate system into a data mosaic having a second coordinate system which may be different from the first coordinate system, comprising:

means for forming for the first set of data a table having a plurality of entries, each such entry having a coordinate position in the first coordinate system having any of the first set of data, and each coordinate position in the second coordinate system corresponding to that coordinate position in the first coordinate system, said means for forming comprising:

means for converting the coordinate position of one item of the first set of data into a first distance from a first reference point in the first coordinate system;

means for converting the first distance to a coordinate position in a third coordinate system, wherein the coordinate position of the first reference point in the third coordinate system is known;

means for converting the coordinate position in the third coordinate system to a second distance from a second reference point in the second coordinate system, wherein the coordinate position of the second reference point in the third coordinate system is known;

means for converting the second distance to a coordinate position in the second coordinate system; and means, using the table, for converting each of a plurality of coordinate positions in the first coordinate system having at least some of the first set of data to one or more coordinate positions in the second coordinate system.

20. Apparatus as defined in claim 19 wherein said means for forming further comprises:

means for determining whether the first distance exceeds a preset value.

21. Apparatus as defined in claim 19 wherein said means for converting the first distance to a coordinate position in a third coordinate system comprises means for converting the first distance to a latitude and longitude position.

22. Apparatus for inserting a first set of data having a first coordinate system into a data mosaic having a second coordinate system which may be different from the first coordinate system, comprising:

means for converting first coordinate positions for the first set of data in the first coordinate system into second corresponding coordinate positions in the second coordinate system;

means for defining an array of data of a first value in the second coordinate system, the array including all of the second coordinate positions;

means for changing the value of each of a first subarray of the array of data from the first value to a second value, the subarray consisting of all coordinate positions in the second coordinate system that could be mapped into any of the first coordinate positions in the first coordinate system;

means for changing the value of each of the second coordinate positions in the array of data from the second value to a third value;

means, for a location in the array having the second value, for determining the positionally closest corresponding one of the first coordinate positions; and means for inserting the value of the positionally closest corresponding one of the first coordinate positions in a location of the second coordinate system corresponding to the coordinate position in the array having the second value.

23. Apparatus as defined in claim 22 wherein said means for converting first coordinate positions into second corresponding coordinate positions comprises:

means for converting the coordinate position of one item of the first set of data into a first distance from a first reference point in the first coordinate system;

means for converting the first distance to a coordinate position in a third coordinate system, wherein the coordinate position of the first reference point in the third coordinate system is known;

means for converting the coordinate position in the third coordinate system to a second distance from a second reference point in the second coordinate system, wherein the coordinate position of the second reference point in the third coordinate system is known; and means for converting the second distance to a coordinate position in the second coordinate system.

24. Apparatus as defined in claim 23 wherein said means for converting the first distance to a coordinate position in a third coordinate system comprises means for converting the first distance to a latitude and longitude position.

25. Apparatus as defined in claim 22 wherein said means for converting first coordinate positions into second corresponding coordinate positions comprises:

means for converting the coordinate position of one item of the first set of data into a first relative coordinate position relative to a first reference point in the first coordinate system;

means for converting the first relative coordinate position to a coordinate position in a third coordinate system, wherein the coordinate position of the first reference point in the third coordinate system is known;

means for converting the coordinate position in the third coordinate system to a second relative coordinate position relative to a second reference point in the second coordinate system, wherein the coordinate position of the second reference point in the third coordinate system is known; and means for converting the second relative coordinate position to a coordinate position in the second coordinate system.

26. Apparatus as defined in claim 25 wherein said means for converting the first relative coordinate position to a coordinate position in a third coordinate system comprises means for converting the first relative coordinate position to a latitude and longitude position.

27. Apparatus as defined in claim 22 wherein said means for converting first coordinate positions into second corresponding coordinate positions comprises:

means for forming for the first set of data a table having a plurality of entries, each such entry having a coordinate position in the first coordinate system having any of the first set of data, and each coordinate position in the second coordinate system corresponding to that coordinate position in the first coordinate system, said means for forming comprising:

means for converting the coordinate position of one item of the first set of data into a first distance from a first reference point in the first coordinate system;

means for converting the first distance to a coordinate position in a third coordinate system, wherein the coordinate position of the first reference point in the third coordinate system is known;

means for converting the coordinate position in the third coordinate system to a second distance from a second reference point in the second coordinate system, wherein the coordinate position of the second reference point in the third coordinate system is known;

means for converting the second distance to a coordinate position in the second coordinate system; and means, using the table, for converting each of a plurality of coordinate positions in the first coordinate system having at least some of the first set of data to one or more coordinate positions in the second coordinate system.

28. Apparatus as defined in claim 27 wherein said means for converting the first distance to a coordinate position in a third coordinate system comprises means for converting the first distance to a latitude and longitude position.

29. Apparatus as defined in claim 22 wherein said means for converting first coordinate positions into second corresponding coordinate positions comprises:

means for forming for the first set of data a table having a plurality of entries, each such entry having a coordinate position in the first coordinate system having any of the first set of data, and each coordinate position in the second coordinate system corresponding to that coordinate position in the first coordinate system, said means for forming comprising:

means for converting the coordinate position of one item of the first set of data into a first relative coordinate position relative to a first reference point in the first coordinate system;

means for converting the first relative coordinate position to a coordinate position in a third coordinate system, wherein the coordinate position of the first reference point in the third coordinate system is known;

means for converting the coordinate position in the third coordinate system to a second relative coordinate position relative to a second reference point in the second coordinate system, wherein the coordinate position of the second reference point in the third coordinate system is known;

means for converting the second relative coordinate position to a coordinate position in the second coordinate system; and means, using the table, for converting each of a plurality of coordinate positions in the first coordinate system having at least some of the first set of data to one or more coordinate positions in the second coordinate system.

30. Apparatus as defined in claim 29 wherein said means for converting the first relative coordinate position to a coordinate position in a third coordinate system comprises means for converting the first relative coordinate position to a latitude and longitude position.

31. A method for inserting a first set of data having a first coordinate system into a data mosaic having a second coordinate system which may be different from the first coordinate system, comprising the steps of:

converting the coordinate position of one item of the first set of data into a first relative coordinate position relative to a first reference point in the first coordinate system;

converting the first relative coordinate position to a coordinate position in a third coordinate system, wherein the coordinate position of the first reference point in the third coordinate system is known;

converting the coordinate position in the third coordinate system to a second relative coordinate position relative to a second reference point in the second coordinate system, wherein the coordinate position of the second reference point in the third coordinate system is known; and converting the second relative coordinate position to a coordinate position in the second coordinate system.

32. A method as defined in claim 31 wherein said step of converting the first relative coordinate position to a coordinate position in a third coordinate system comprises converting the first relative coordinate position to a latitude and longitude position.

33. A method for inserting a first set of data having a first coordinate system into a data mosaic having a second coordinate system which may be different from the first coordinate system, comprising the steps of:

forming for the first set of data a table having a plurality of entries, each such entry having a coordinate position in the first coordinate system having any of the first set of data, and each coordinate position in the second coordinate system corresponding to that coordinate position in the first coordinate system, said forming step comprising the steps of:

converting the coordinate position of one item of the first set of data into a first relative coordinate position relative to a first reference point in the first coordinate system;

converting the first relative coordinate position to a coordinate position in a third coordinate system, wherein the coordinate position of the first reference point in the third coordinate system is known;

converting the coordinate position in the third coordinate system to a second relative coordinate position relative to a second reference point in the second coordinate system, wherein the coordinate position of the second reference point in the third coordinate system is known;

converting the second relative coordinate position to a coordinate position in the second coordinate system; and after said forming step, using the table, converting each of a plurality of coordinate positions in the first coordinate system having at least some of the first set of data to one or more coordinate positions in the second coordinate system.

34. A method as defined in claim 33 wherein said step of converting the first relative coordinate position to a coordinate position in a third coordinate system comprises converting the first relative coordinate position to a latitude and longitude position.

35. Apparatus for inserting a first set of data having a first coordinate system into a data mosaic having a second coordinate system which may be different from the first coordinate system, comprising:

- means for converting the coordinate position of one item of the first set of data into a first relative coordinate position relative to a first reference point in the first coordinate system;
- means for converting the first relative coordinate position to a coordinate position in a third coordinate system, wherein the coordinate position of the first reference point in the third coordinate system is known;
- means for converting the coordinate position in the third coordinate system to a second relative coordinate position relative to a second reference point in the second coordinate system, wherein the coordinate position of the second reference point in the third coordinate system is known; and
- means for converting the second relative coordinate position to a coordinate position in the second coordinate system.

36. Apparatus as defined in claim 35 wherein said means for converting the first relative coordinate position to a coordinate position in a third coordinate system comprises means for converting the first relative coordinate position to a latitude and longitude position.

37. Apparatus for inserting a first set of data having a first coordinate system into a data mosaic having a second coordinate system which may be different from the first coordinate system, comprising:

- means for forming for the first set of data a table having a plurality of entries, each such entry having a coordinate position in the first coordinate system having any of the first set of data, and each coordinate position in the second coordinate system corresponding to that coordinate position in the first coordinate system, said means for forming comprising:
  - means for converting the coordinate position of one item of the first set of data into a first relative coordinate position relative to a first reference point in the first coordinate system;
  - means for converting the first relative coordinate position to a coordinate position in a third coordinate system, wherein the coordinate position of the first reference point in the third coordinate system is known;
  - means for converting the coordinate position in the third coordinate system to a second relative coordinate position relative to a second reference point in the second coordinate system, wherein the coordinate position of the second reference point in the third coordinate system is known;
  - means for converting the second relative coordinate position to a coordinate position in the second coordinate system; and
- means, using the table, for converting each of a plurality of coordinate positions in the first coordinate system having at least some of the first set of data to one or more coordinate positions in the second coordinate system.

38. Apparatus as defined in claim 37 wherein said means for converting the first relative coordinate position to a coordinate position in a third coordinate system comprises means for converting the first relative coordinate position to a latitude and longitude position.

* * * * *